US011640297B2

(12) United States Patent
Maiyuran et al.

(10) Patent No.: US 11,640,297 B2
(45) Date of Patent: *May 2, 2023

(54) INSTRUCTION AND LOGIC FOR SYSTOLIC DOT PRODUCT WITH ACCUMULATE

(71) Applicant: Intel Corporation, Santa Clara, CA (US)

(72) Inventors: Subramaniam Maiyuran, Gold River, CA (US); Guei-Yuan Lueh, San Jose, CA (US); Supratim Pal, Bangalore (IN); Ashutosh Garg, Folsom, CA (US); Chandra S. Gurram, Folsom, CA (US); Jorge E. Parra, El Dorado Hills, CA (US); Junjie Gu, Santa Clara, CA (US); Konrad Trifunovic, Mierzyn (PL); Hong Bin Liao, Beijing (CN); Mike B. MacPherson, Portland, OR (US); Shubh B. Shah, Folsom, CA (US); Shubra Marwaha, Santa Clara, CA (US); Stephen Junkins, Bend, OR (US); Timothy R. Bauer, Santa Clara, CA (US); Varghese George, Folsom, CA (US); Weiyu Chen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/304,153

(22) Filed: Jun. 15, 2021

(65) Prior Publication Data

US 2021/0303299 A1    Sep. 30, 2021

Related U.S. Application Data

(63) Continuation of application No. 15/957,728, filed on Apr. 19, 2018, now Pat. No. 11,042,370.

(51) Int. Cl.
*G06F 9/30* (2018.01)
*G06T 1/20* (2006.01)
*G06F 9/38* (2018.01)

(52) U.S. Cl.
CPC ........ *G06F 9/3001* (2013.01); *G06F 9/30145* (2013.01); *G06F 9/3802* (2013.01); *G06F 9/3887* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 5,014,196 A | * | 5/1991 | Hayashi | G06F 9/3867 712/7 |
| 2004/0172519 A1 | * | 9/2004 | Nakajima | G06F 9/30181 712/E9.035 |
| 2006/0149936 A1 | * | 7/2006 | Boukaya | G06F 9/3867 712/225 |

OTHER PUBLICATIONS

Notification of CN Publication for CN Application No. 201910207919.0, dated Oct. 29, 2019, 5 pages.

(Continued)

*Primary Examiner* — John M Lindlof
(74) *Attorney, Agent, or Firm* — Jaffery Watson Mendonsa & Hamilton LLP

(57) ABSTRACT

Embodiments described herein provided for an instruction and associated logic to enable GPGPU program code to access special purpose hardware logic to accelerate dot product operations. One embodiment provides for a graphics processing unit comprising a fetch unit to fetch an instruction for execution and a decode unit to decode the instruction into a decoded instruction. The decoded instruction is a matrix instruction to cause the graphics processing unit to perform a parallel dot product operation. The GPGPU also includes systolic dot product circuitry to execute the (Continued)

decoded instruction across one or more SIMD lanes using multiple systolic layers, wherein to execute the decoded instruction, a dot product computed at a first systolic layer is to be output to a second systolic layer, wherein each systolic layer includes one or more sets of interconnected multipliers and adders, each set of multipliers and adders to generate a dot product.

20 Claims, 27 Drawing Sheets

(56) References Cited

OTHER PUBLICATIONS

Notification of DE Publication for DE Application No. 2019101118.3, dated Oct. 24, 2019, 64 pages.
Notice of Allowance for U.S. Appl. No. 15/957,728, dated Feb. 19, 2021, 5 pages.

* cited by examiner

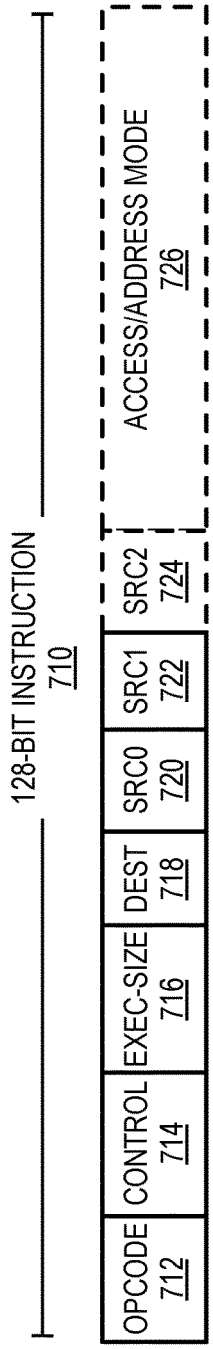
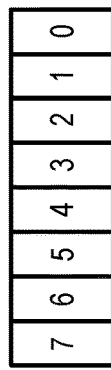
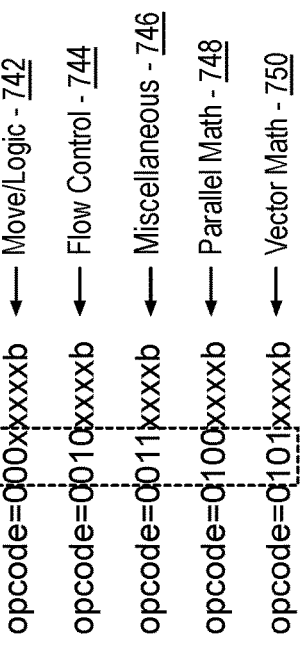
FIG. 7

FIG. 9A  GRAPHICS PROCESSOR COMMAND FORMAT
900
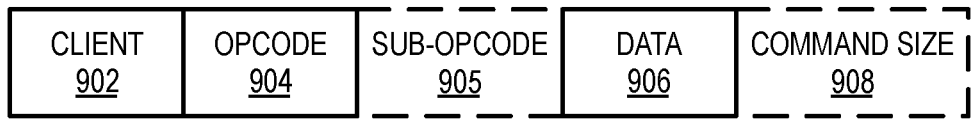
FIG. 9B  GRAPHICS PROCESSOR COMMAND SEQUENCE
910
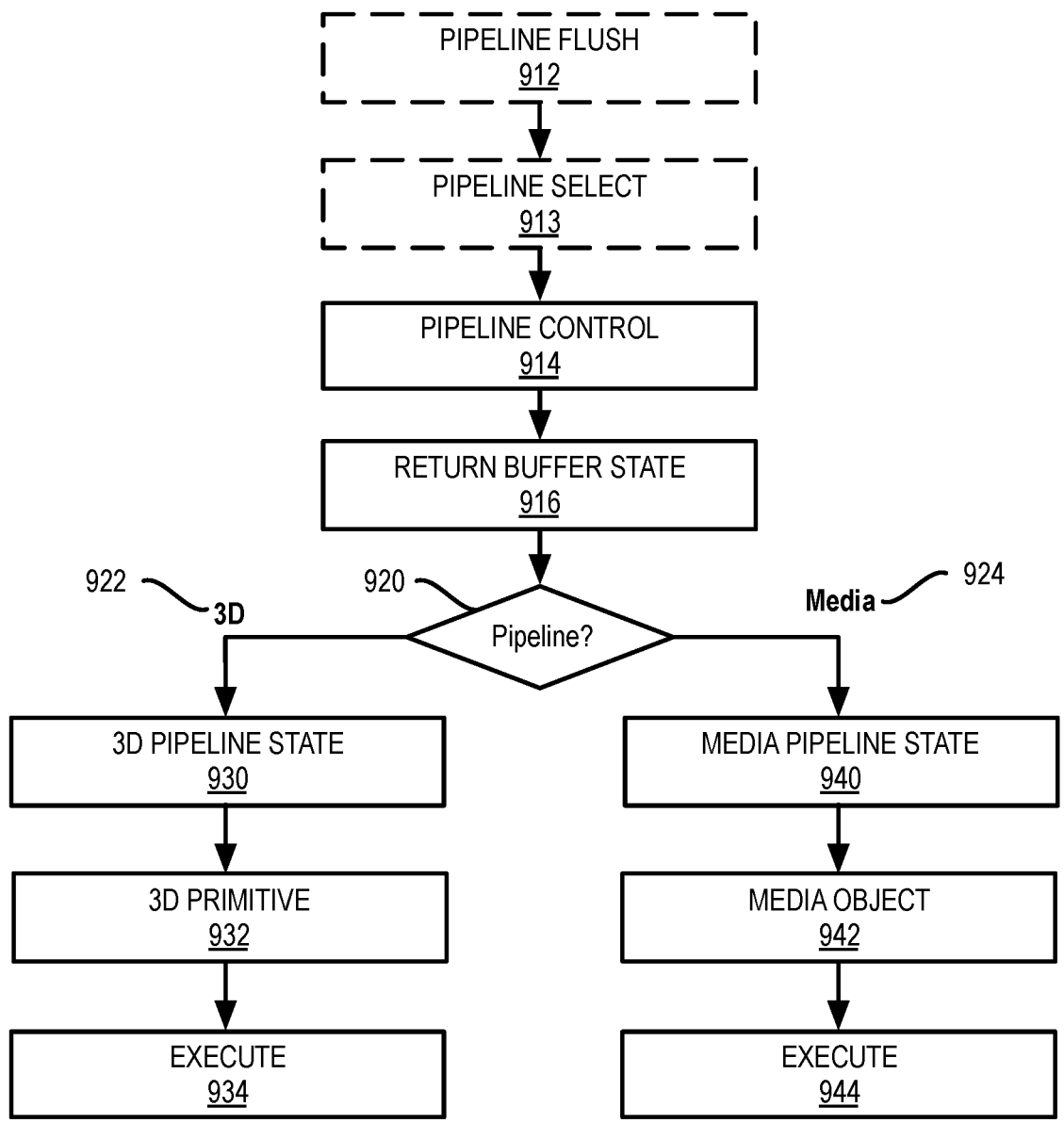

INSTRUCTION AND LOGIC FOR SYSTOLIC DOT PRODUCT WITH ACCUMULATE

CROSS-REFERENCE

This application is a continuation of U.S. application Ser. No. 15/957,728, filed Apr. 19, 2018, the entire contents of which are hereby incorporated herein by reference.

BACKGROUND

A neural network can be modeled as collections of neurons that are connected in an acyclic graph. A neural network can receive an input (a single vector) and transform it through a series of hidden layers. Each hidden layer is made up of a set of neurons, where each neuron is fully connected to all neurons in the previous layer, and where neurons in a single layer function completely independently and do not share any connections. A convolutional neural network (CNN) is similar to a standard neural network. Each neuron receives some inputs, performs a dot product, and optionally follows it with a non-linearity. A CNN, however, is explicitly tailored to handle input image data. Based on raw image data input, the network outputs classification score for the input data.

A parallel data processing system configured to perform neural network processing can include a graphics processor, which can be configured to perform spec operations on graphics data such as, for example, linear interpolation, tessellation, rasterization, texture mapping, depth testing, etc. Portions of graphics processors can be made programmable, enabling such processors to support a wide variety of operations for processing vertex and fragment data. Fully programmable execution units within a graphics processor can be leveraged to perform a variety of parallel processing operations. However, to maximize throughput, graphics processors may perform some operations using specialized, fixed function logic units.

BRIEF DESCRIPTION OF THE DRAWINGS

So that the features of the present invention can be understood in detail, a more particular description of the invention may be had by reference to embodiments, some of which are illustrated in the appended drawings. It is to be noted, however, that the appended drawings illustrate only typical embodiments and are therefore not to be considered limiting of the scope of all embodiments.

FIG. 7 is a block diagram illustrating a graphics processor instruction formats according to some embodiments;

FIG. 9A-9B illustrate a graphics processor command format and command sequence, according to some embodiments;

DESCRIPTION OF EMBODIMENTS

Figure 1:
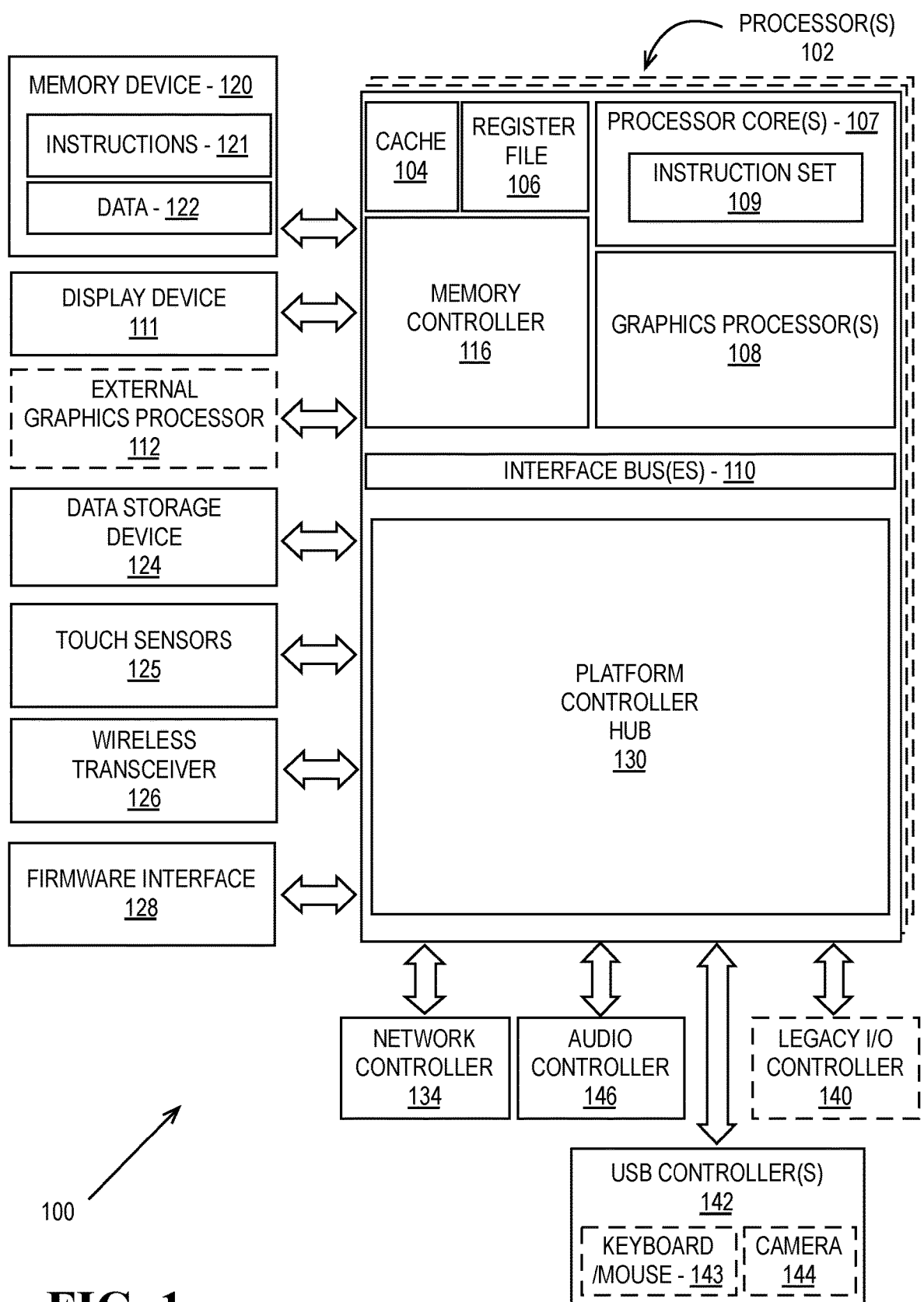
FIG. 1 is a block diagram of a processing system, according to an embodiment.

Existing graphics and compute shader programs can be compiled to perform operations using instructions that are executing on general-purpose graphics execution units within a general-purpose graphics processing unit (GPGPU). For some specialized operations, such as machine-learning specific operations, general-purpose execution units within a GPGPU may be augmented via special purpose hardware logic to accelerate specific operations. Embodiments described herein provided for an instruction and associated logic to enable program code targeted for GPGPU execution to access special purpose hardware logic to accelerate dot product operations.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-14B provide an overview of exemplary data processing system and graphics processor logic that incorporates or relates to the various embodiments. FIGS. 15-22 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating-point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 incudes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 160 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 2:
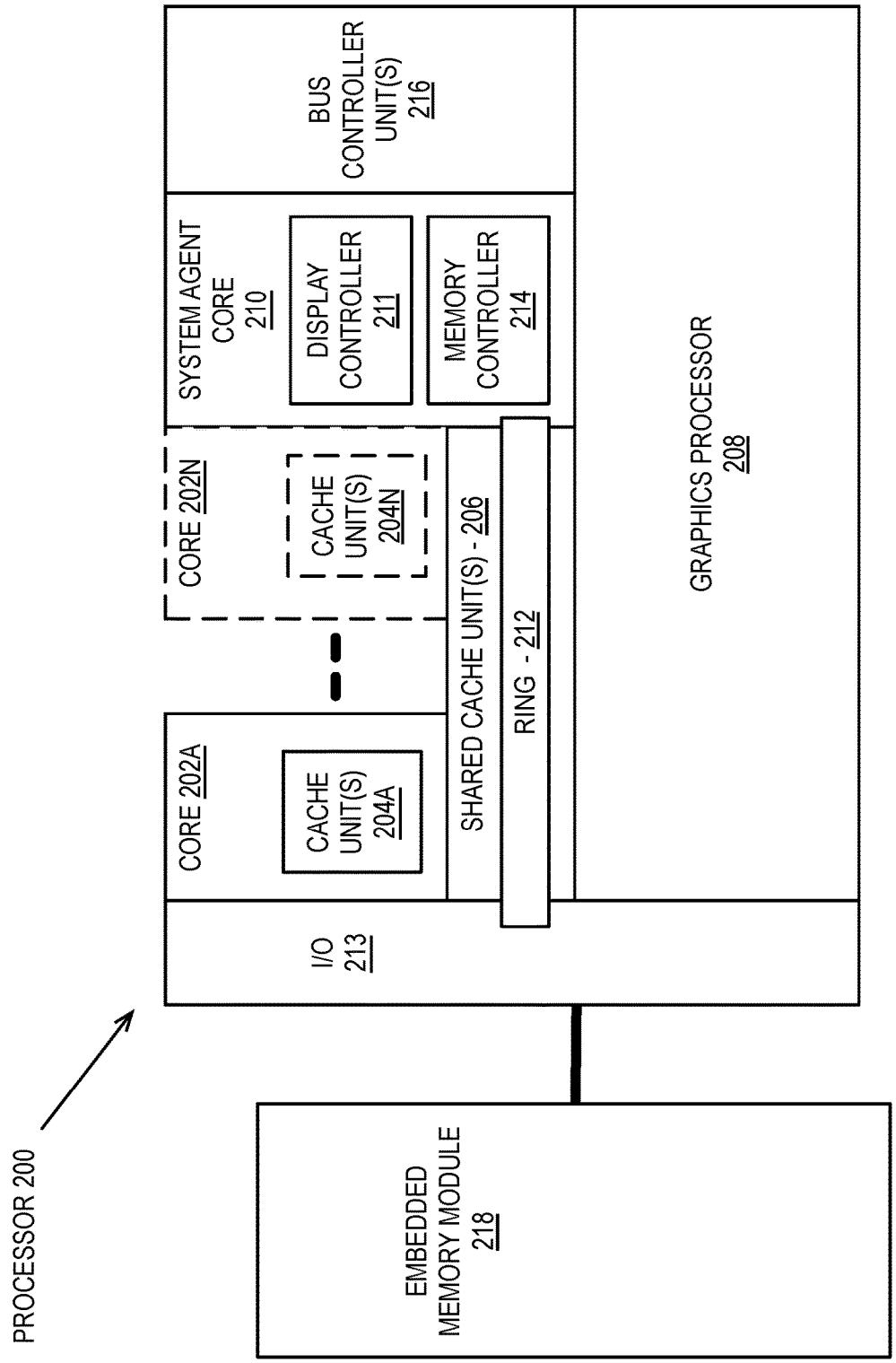
FIG. 2 is a block diagram of a processor according to an embodiment.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
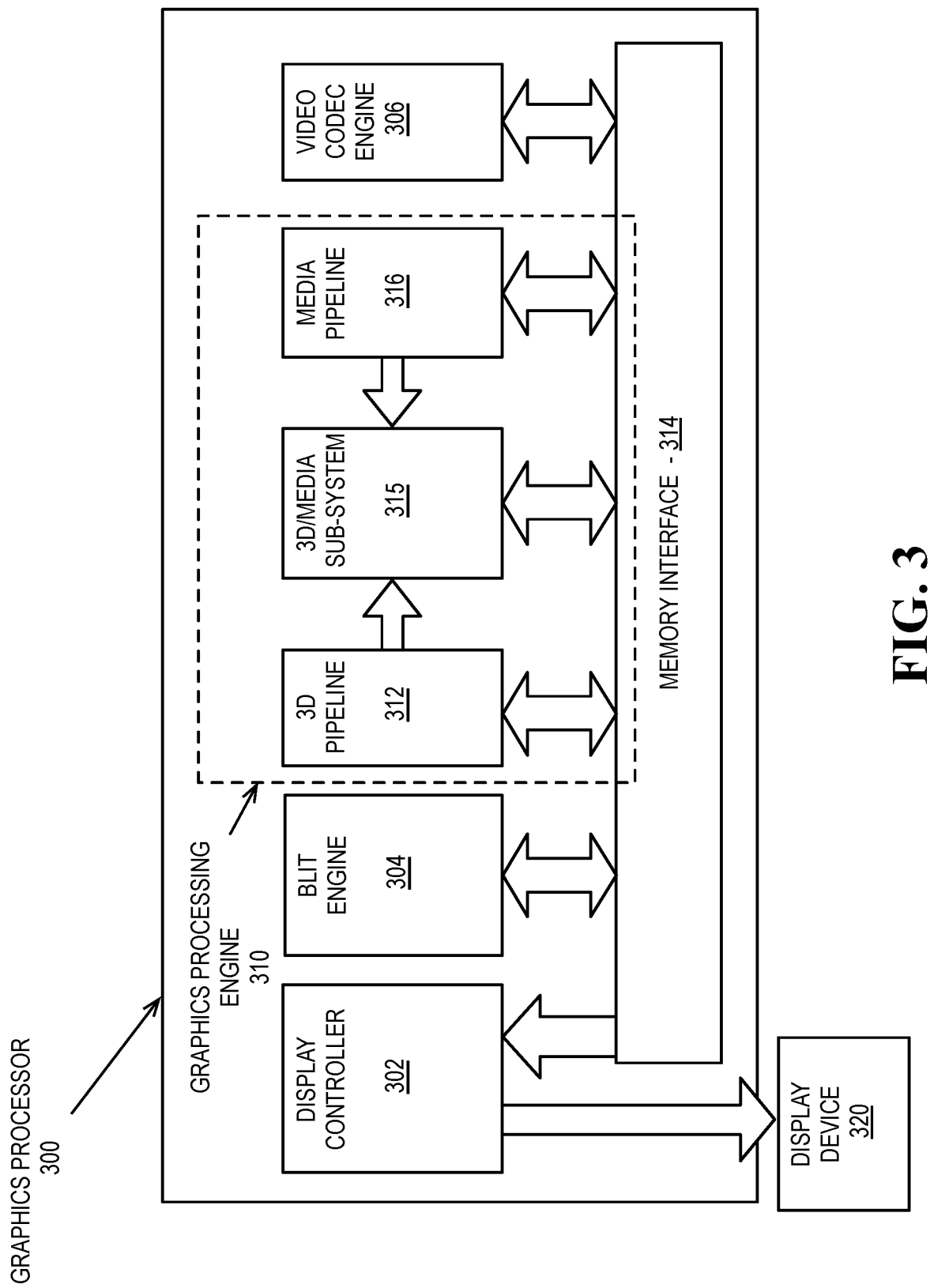
FIG. 3 is a block diagram of a graphics processor, according to an embodiment.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
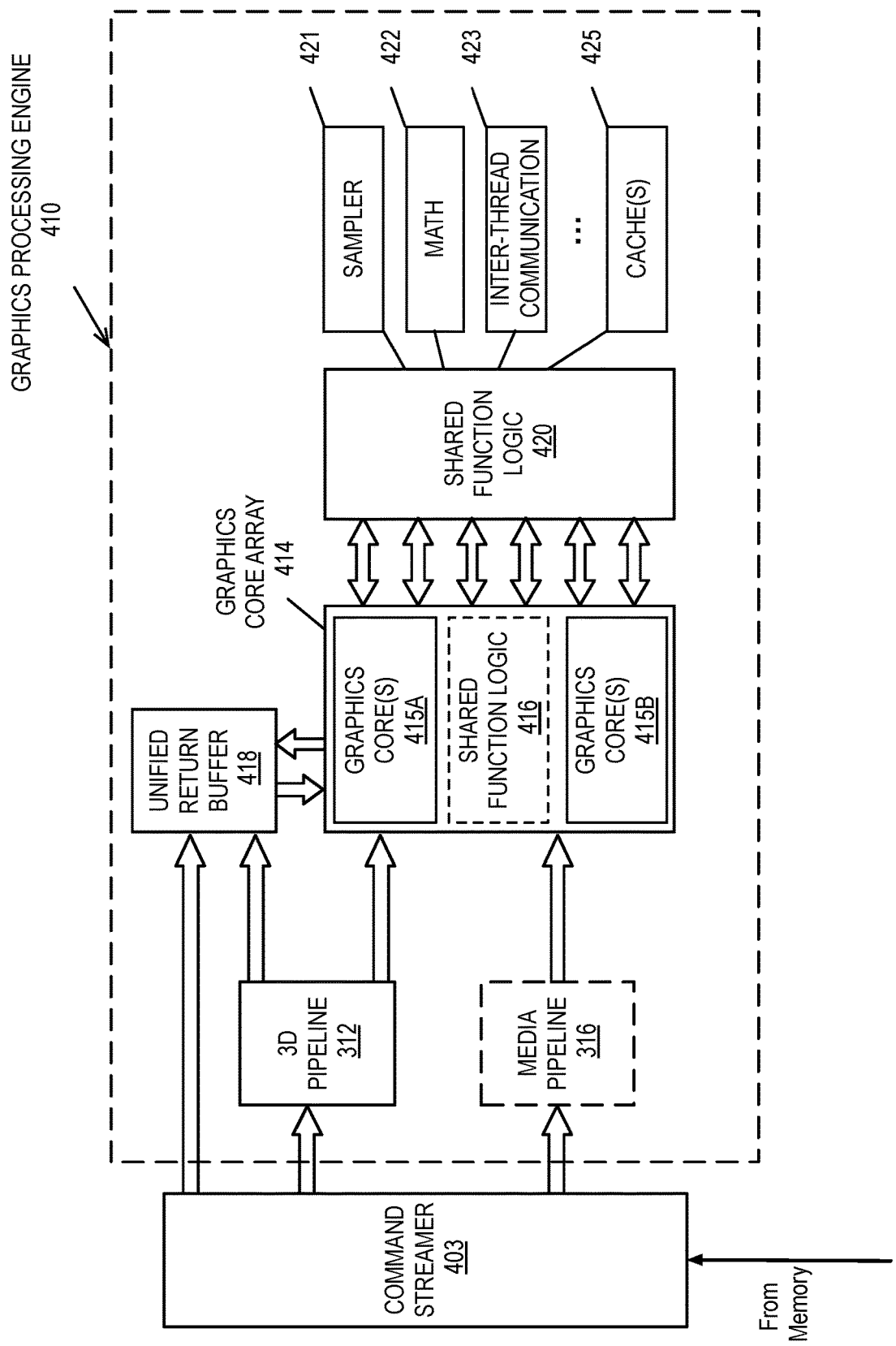
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
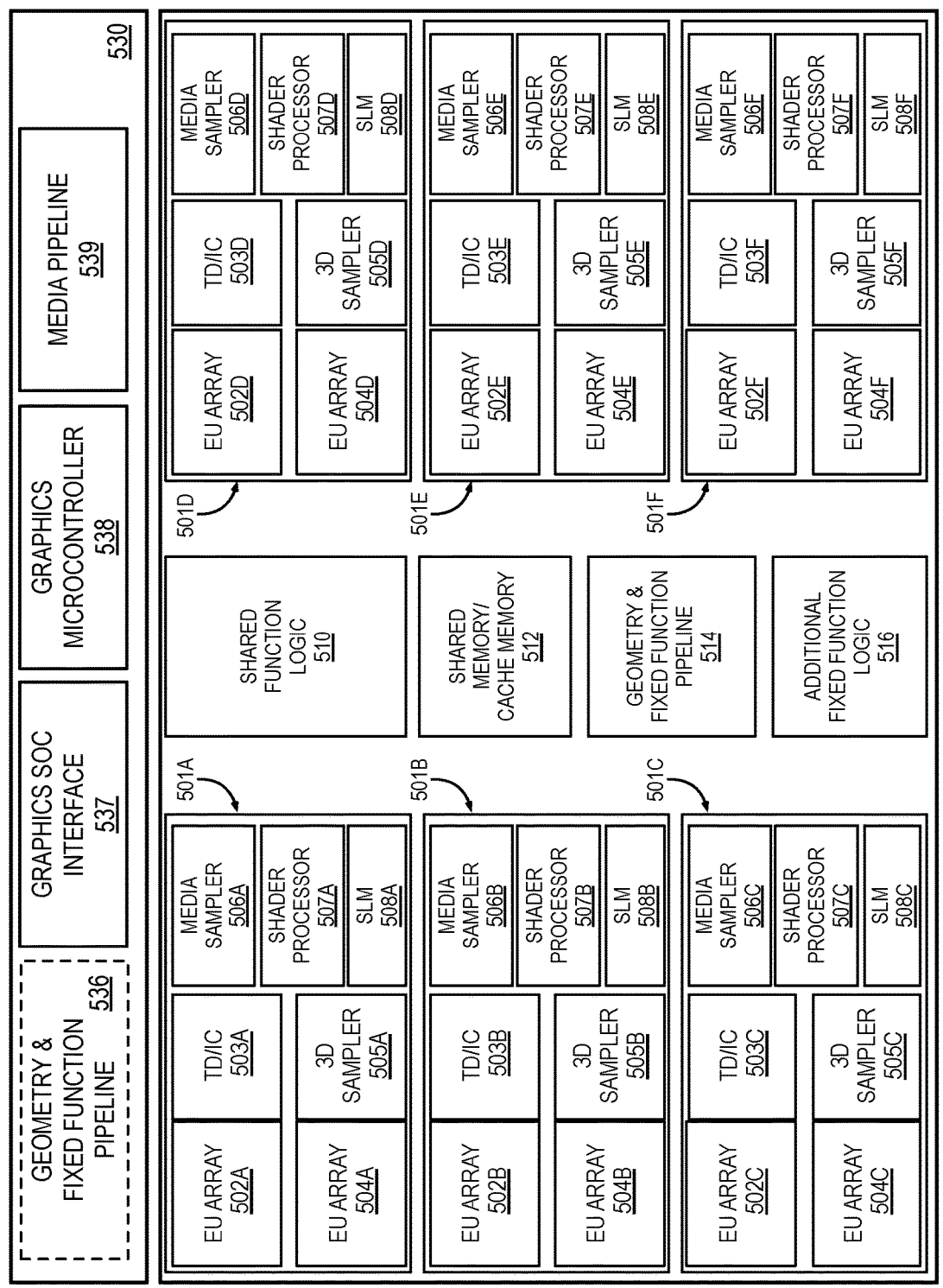
FIG. 5 is a block diagram of hardware logic of a graphics processor core, according to some embodiments described herein.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphics processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
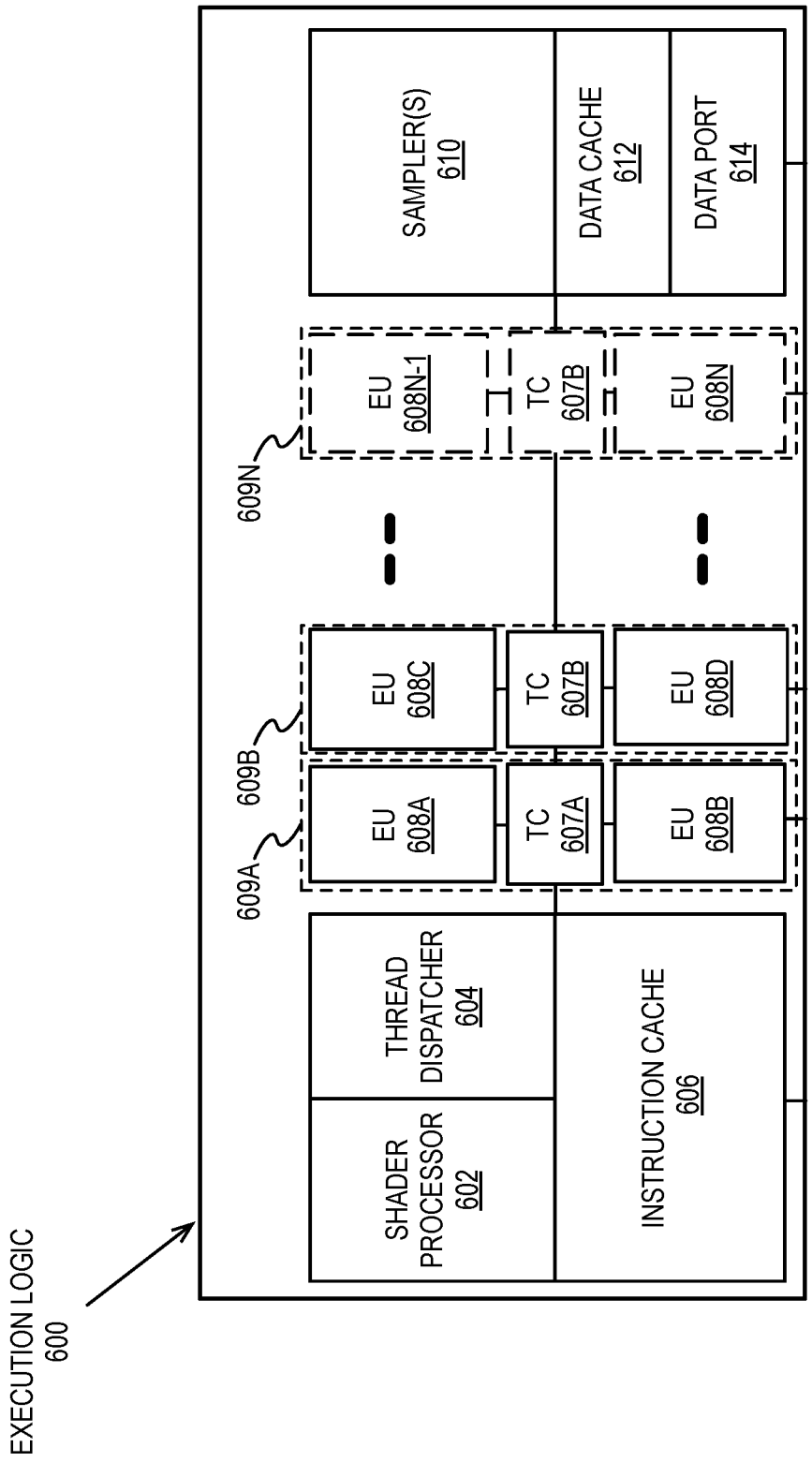
FIG. 6A-6B illustrate thread execution logic including an array of processing elements employed in a graphics processor core according to embodiments described herein.
Figure 6B:
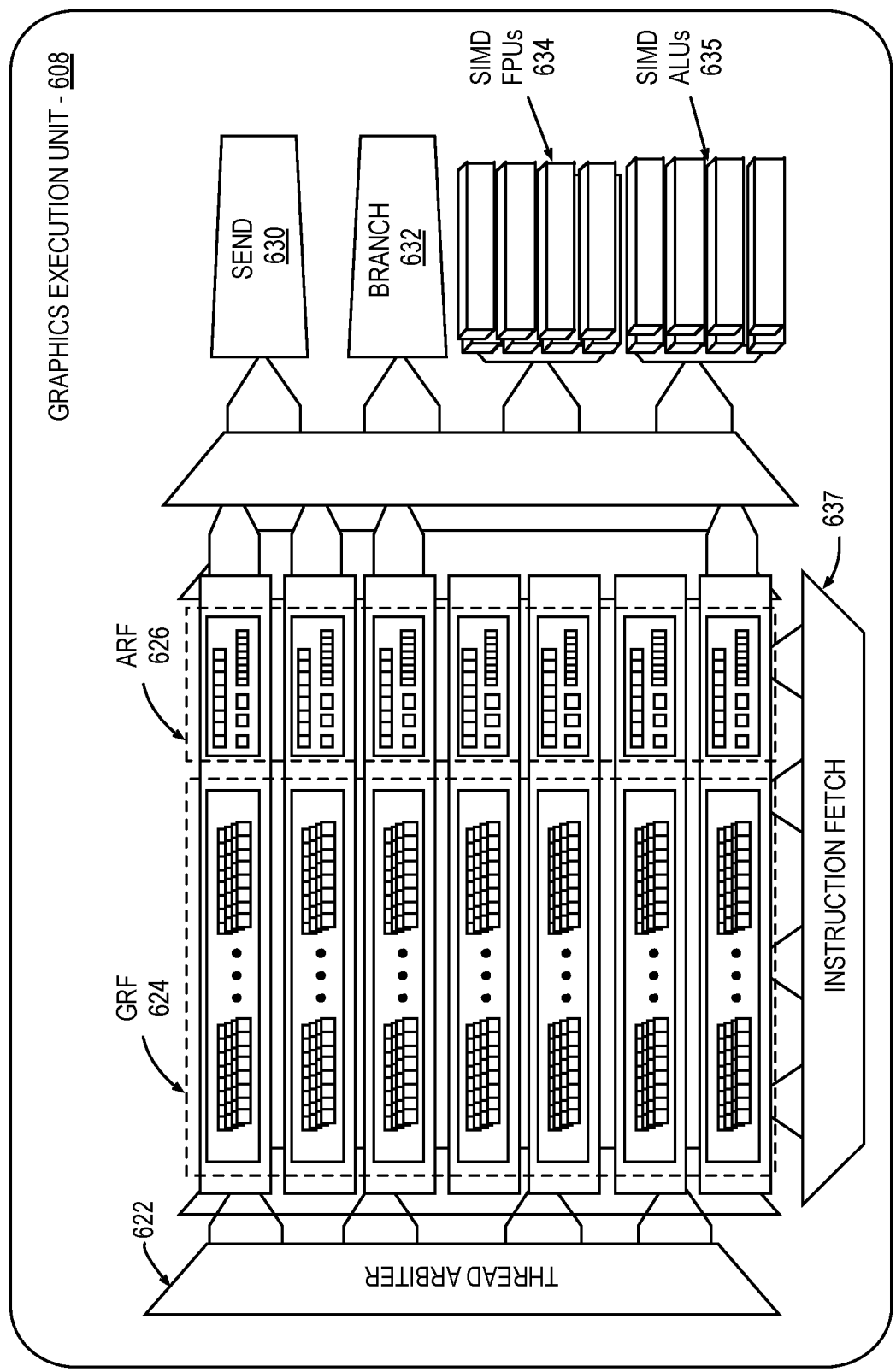

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating-point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating-point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating-point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 632, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating-point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
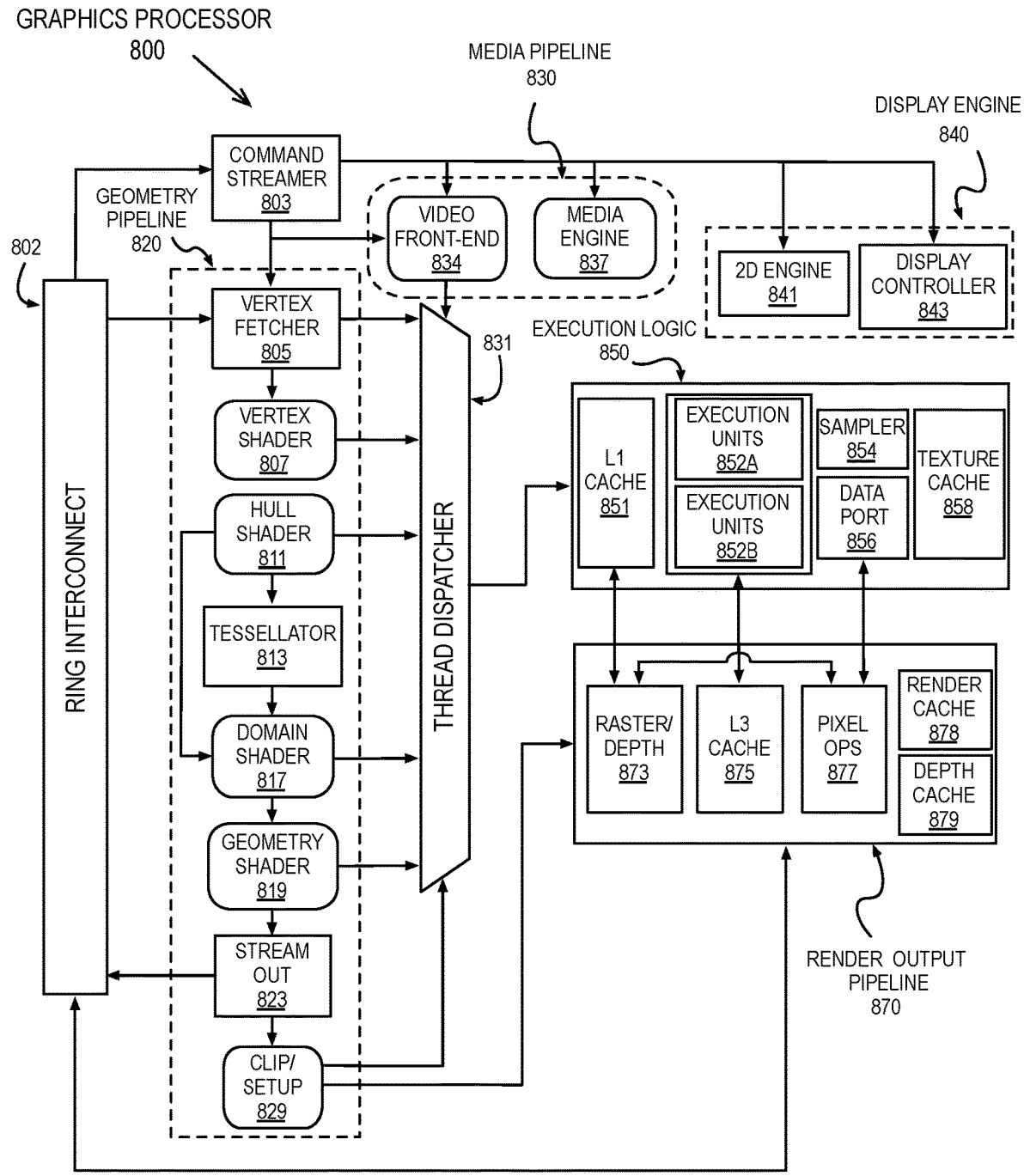
FIG. 8 is a block diagram of a graphics processor according to another embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If tessellation is disabled, the geometry shader 819 receives input from the vertex shader 807. In some embodiments, geometry shader 819 is programmable by a geometry shader program to perform geometry tessellation if the tessellation units are disabled.

Before rasterization, a clipper 829 can process vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands Once the command is received by the client unit, the client unit reads the opcode 904 and, if present, sub-opcode 905 to determine the operation to perform. The client unit performs the command using information in data field 906. For some commands an explicit command size 908 is expected to specify the size of the command In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
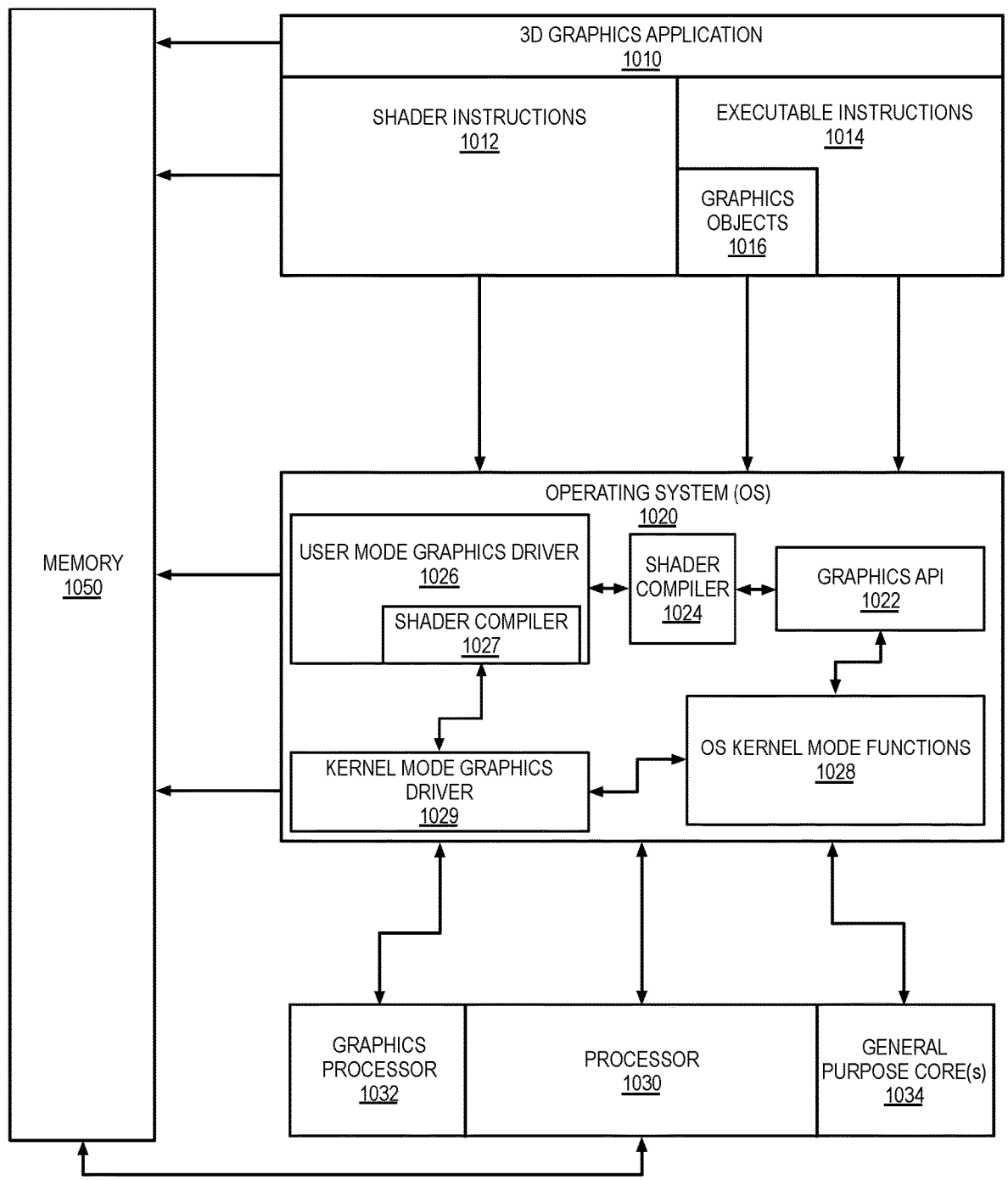
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
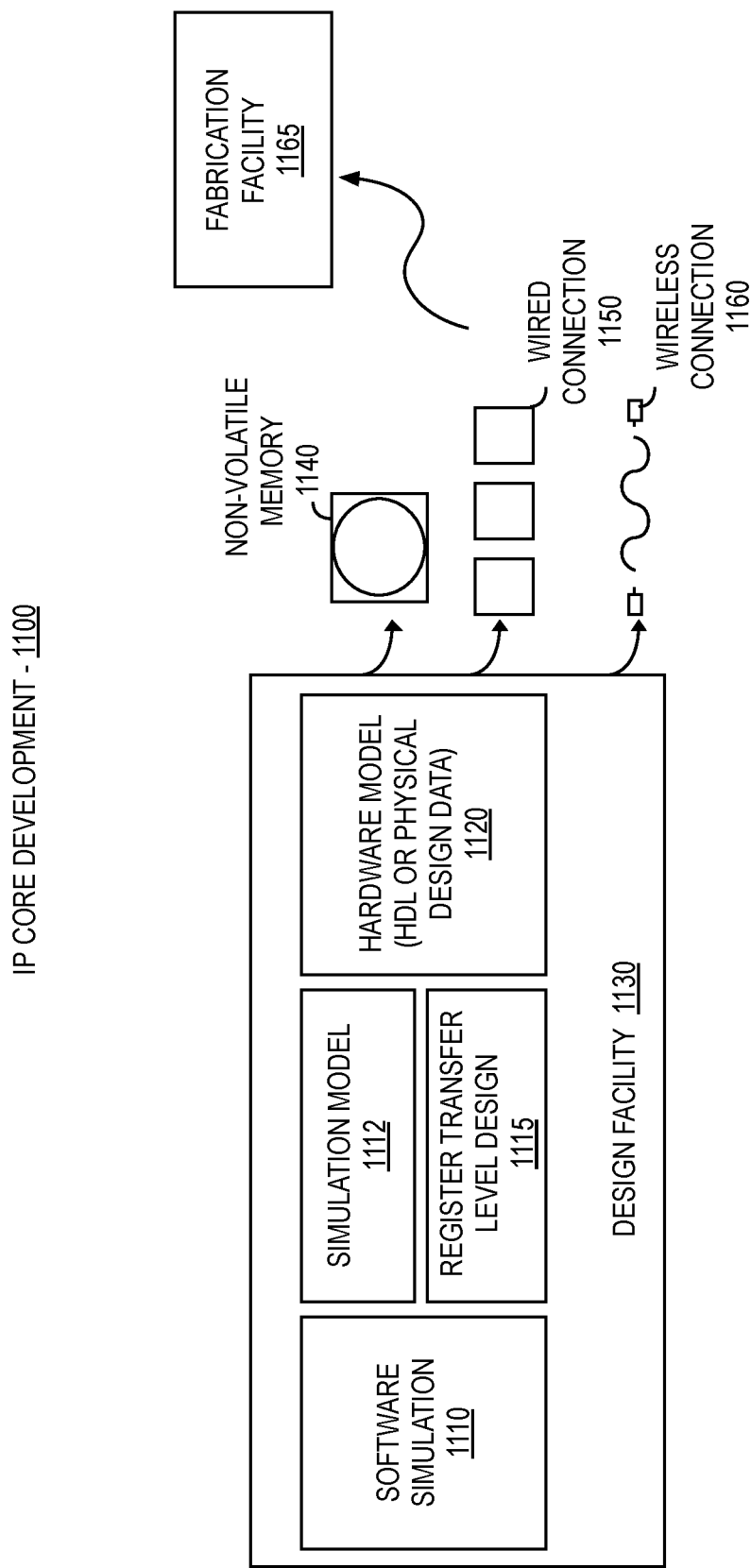
FIG. 11A is a block diagram illustrating an IP core development system, according to an embodiment.

FIG. 11A is a block diagram illustrating an IP core development system 1100 that may be used to manufacture an integrated circuit to perform operations according to an embodiment. The IP core development system 1100 may be used to generate modular, reusable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
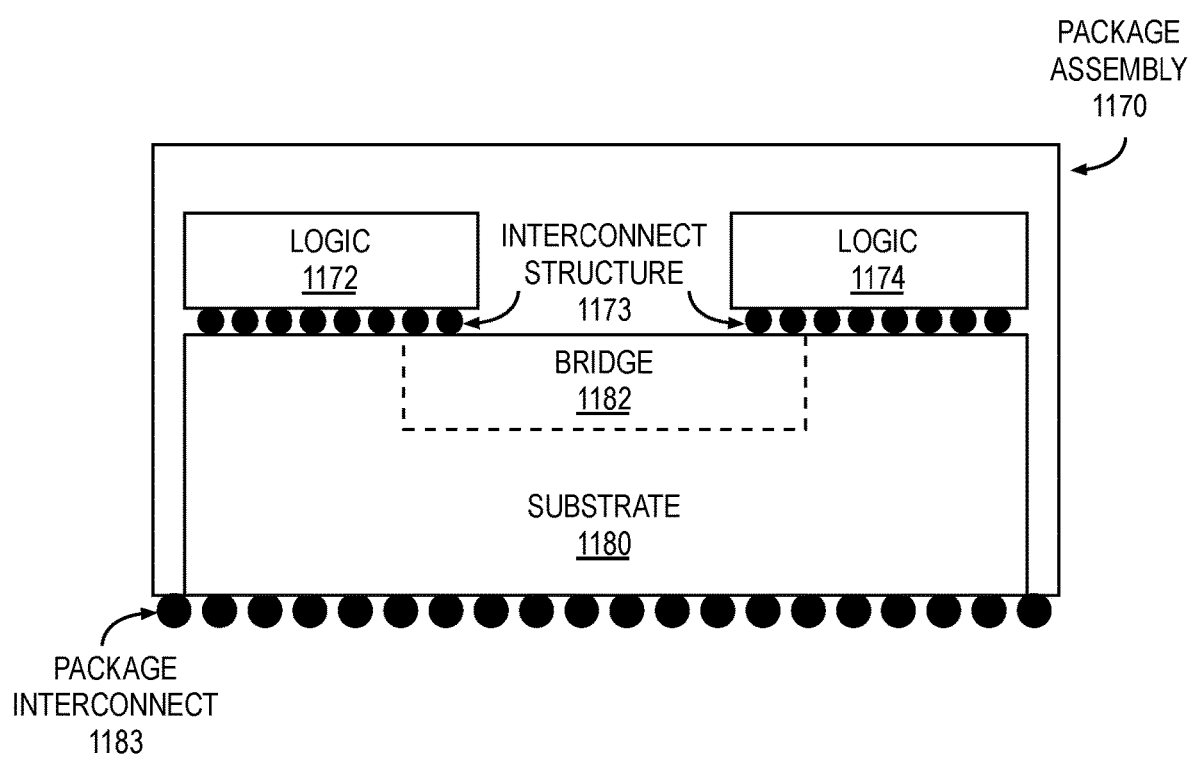
FIG. 11B illustrates a cross-section side view of an integrated circuit package assembly, according to some embodiments described herein.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
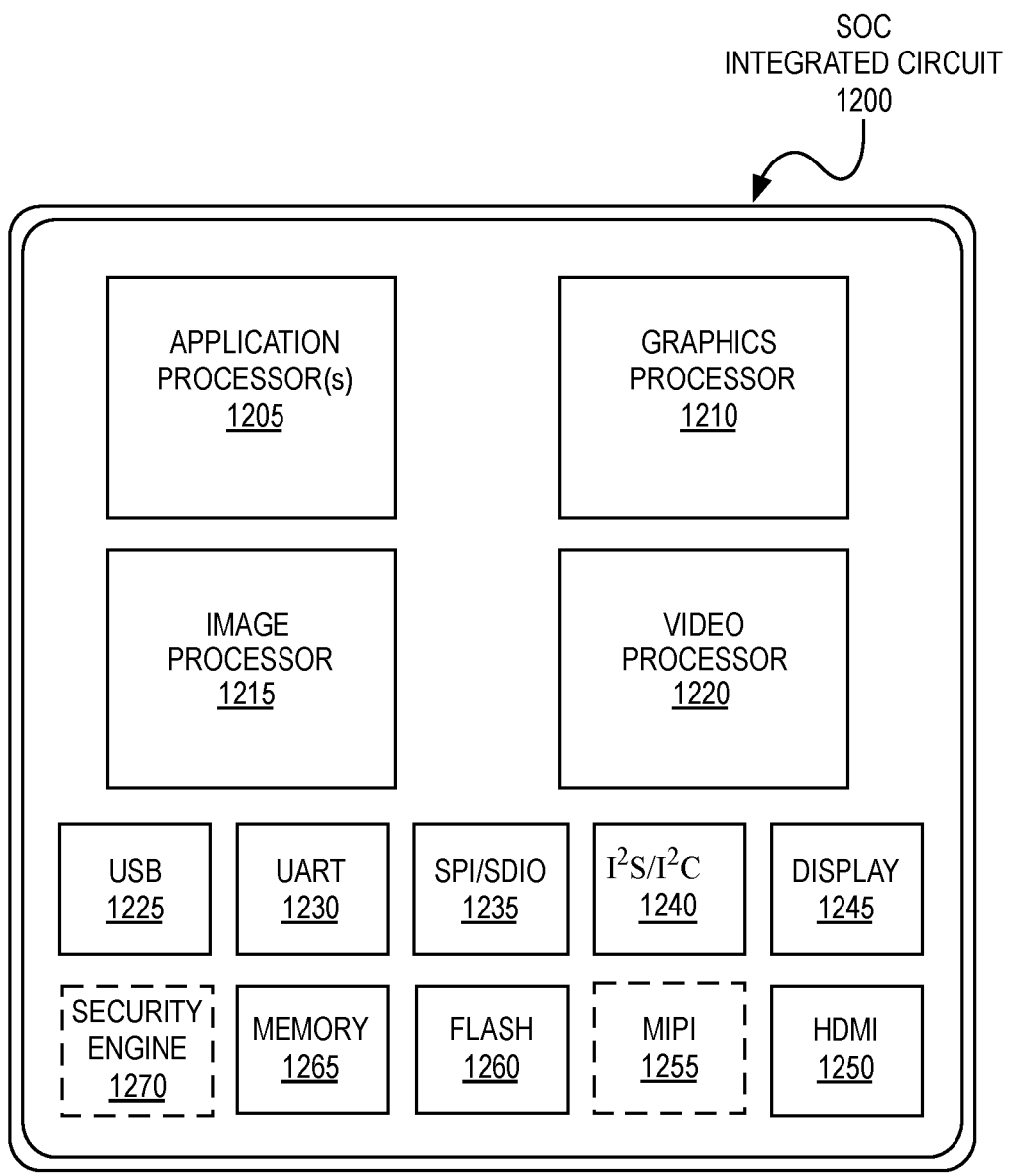
FIG. 12 is a block diagram illustrating an exemplary system on a chip integrated circuit, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
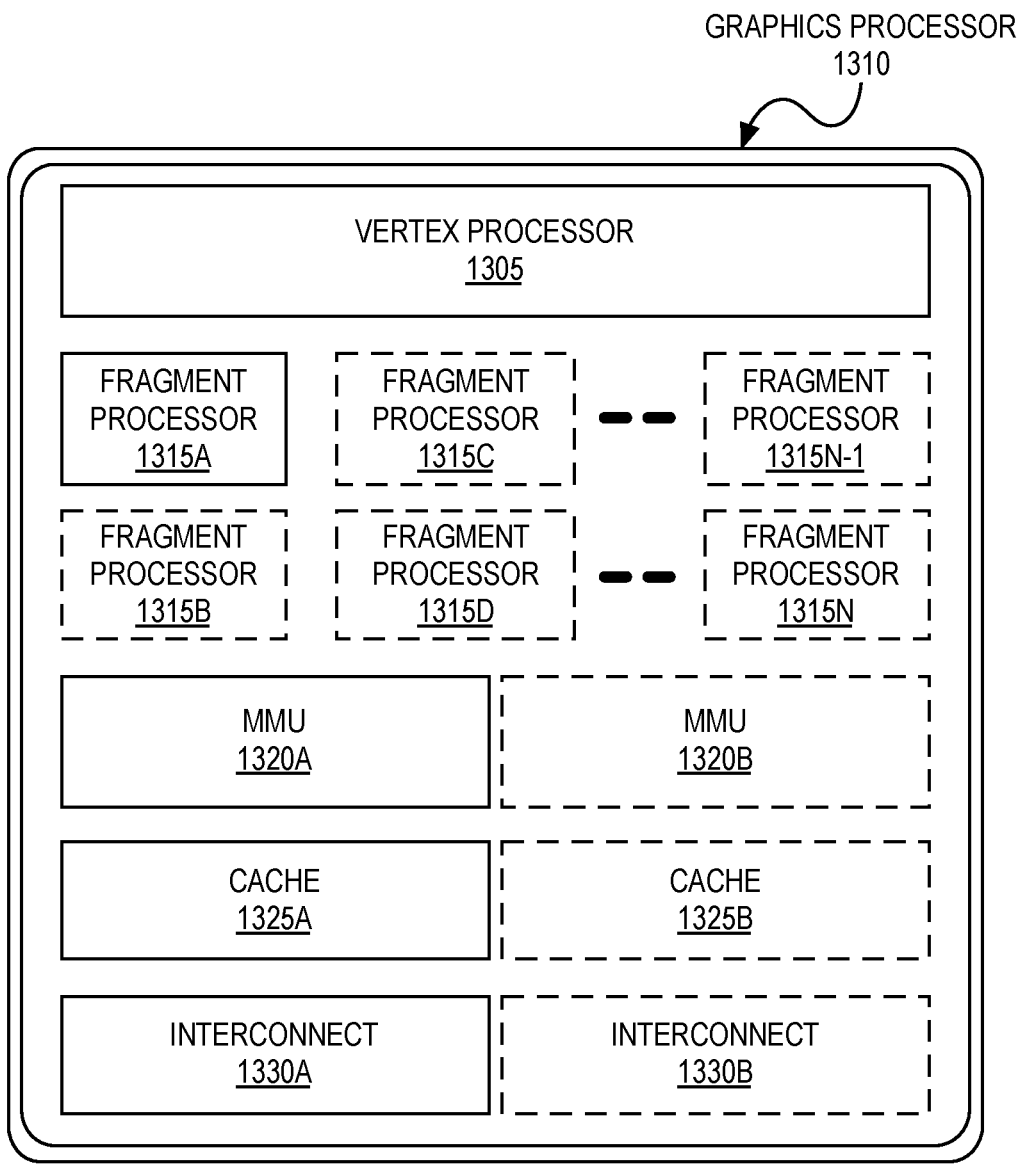
FIG. 13A-13B are block diagrams illustrating exemplary graphics processors for use within an SoC, according to embodiments described herein.
Figure 13B:
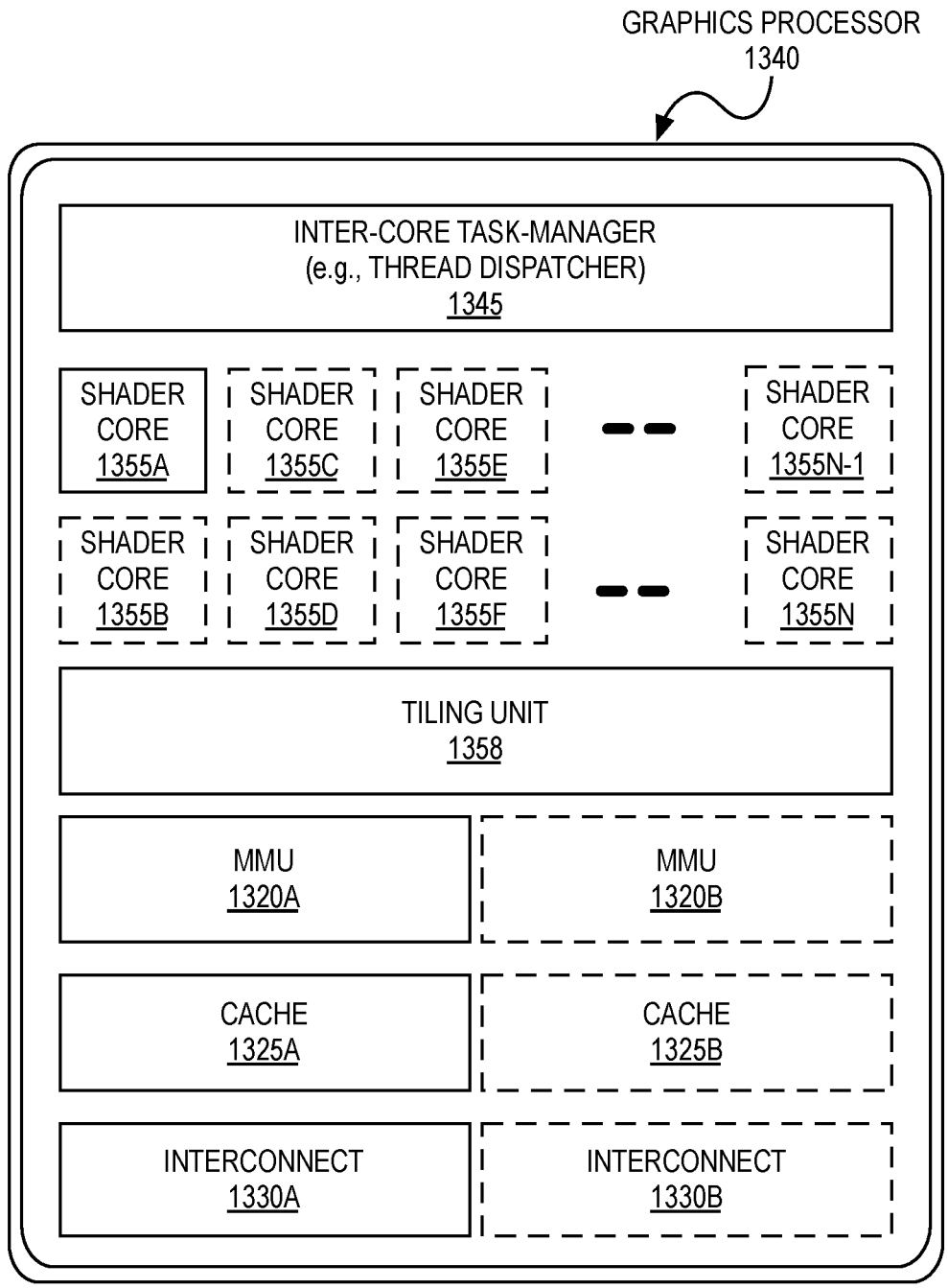

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment, the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
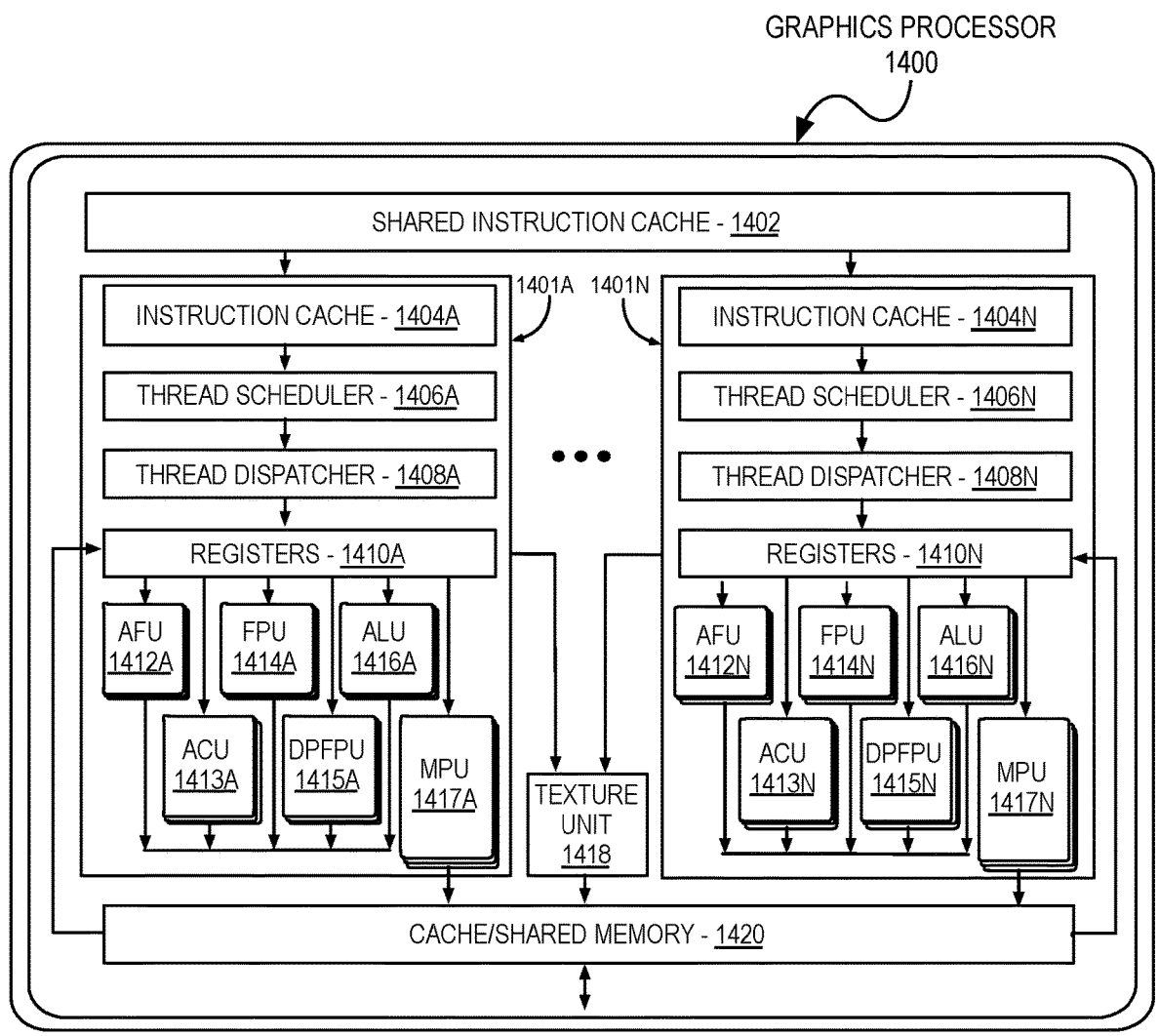
FIG. 14A-14B illustrate additional exemplary graphics processor logic according to embodiments described herein.
Figure 14B:
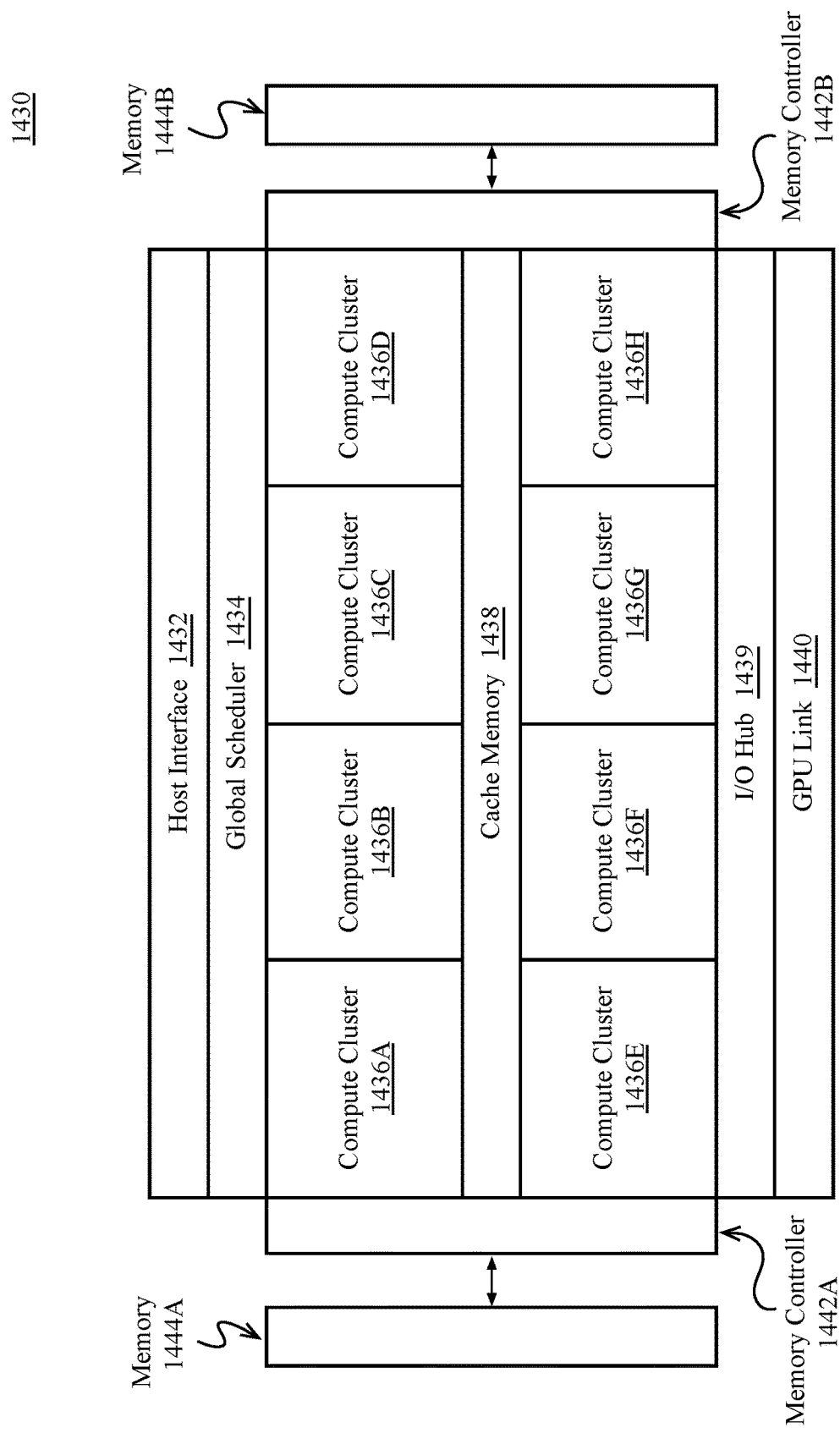

FIGS. 14A-14B illustrate additional exemplary graphics processor logic according to embodiments described herein. FIG. 14A illustrates a graphics core 1400 that may be included within the graphics processor 1210 of FIG. 12 and may be a unified shader core 1355A-1355N as in FIG. 13B. FIG. 14B illustrates a highly-parallel general-purpose graphics processing unit 1430 suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating-point operations, while the DPFPUs 1415A-1415N perform double precision (64-bit) floating-point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating-point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random-access memory (DRAM) or graphics random access memory, such as synchronous graphics random access memory (SGRAM), including graphics double data rate (GDDR) memory.

In one embodiment, the compute clusters 1436A-1436H each include a set of graphics cores, such as the graphics core 1400 of FIG. 14A, which can include multiple types of integer and floating-point logic units that can perform computational operations at a range of precisions including suited for machine learning computations. For example and in one embodiment at least a subset of the floating-point units in each of the compute clusters 1436A-1436H can be configured to perform 16-bit or 32-bit floating-point operations, while a different subset of the floating-point units can be configured to perform 64-bit floating-point operations.

Multiple instances of the GPGPU 1430 can be configured to operate as a compute cluster. The communication mechanism used by the compute cluster for synchronization and data exchange varies across embodiments. In one embodiment, the multiple instances of the GPGPU 1430 communicate over the host interface 1432. In one embodiment, the GPGPU 1430 includes an I/O hub 1439 that couples the GPGPU 1430 with a GPU link 1440 that enables a direct connection to other instances of the GPGPU. In one embodiment, the GPU link 1440 is coupled to a dedicated GPU-to-GPU bridge that enables communication and synchronization between multiple instances of the GPGPU 1430. In one embodiment, the GPU link 1440 couples with a high-speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

GPGPU with Matrix Acceleration Logic

Figure 15:
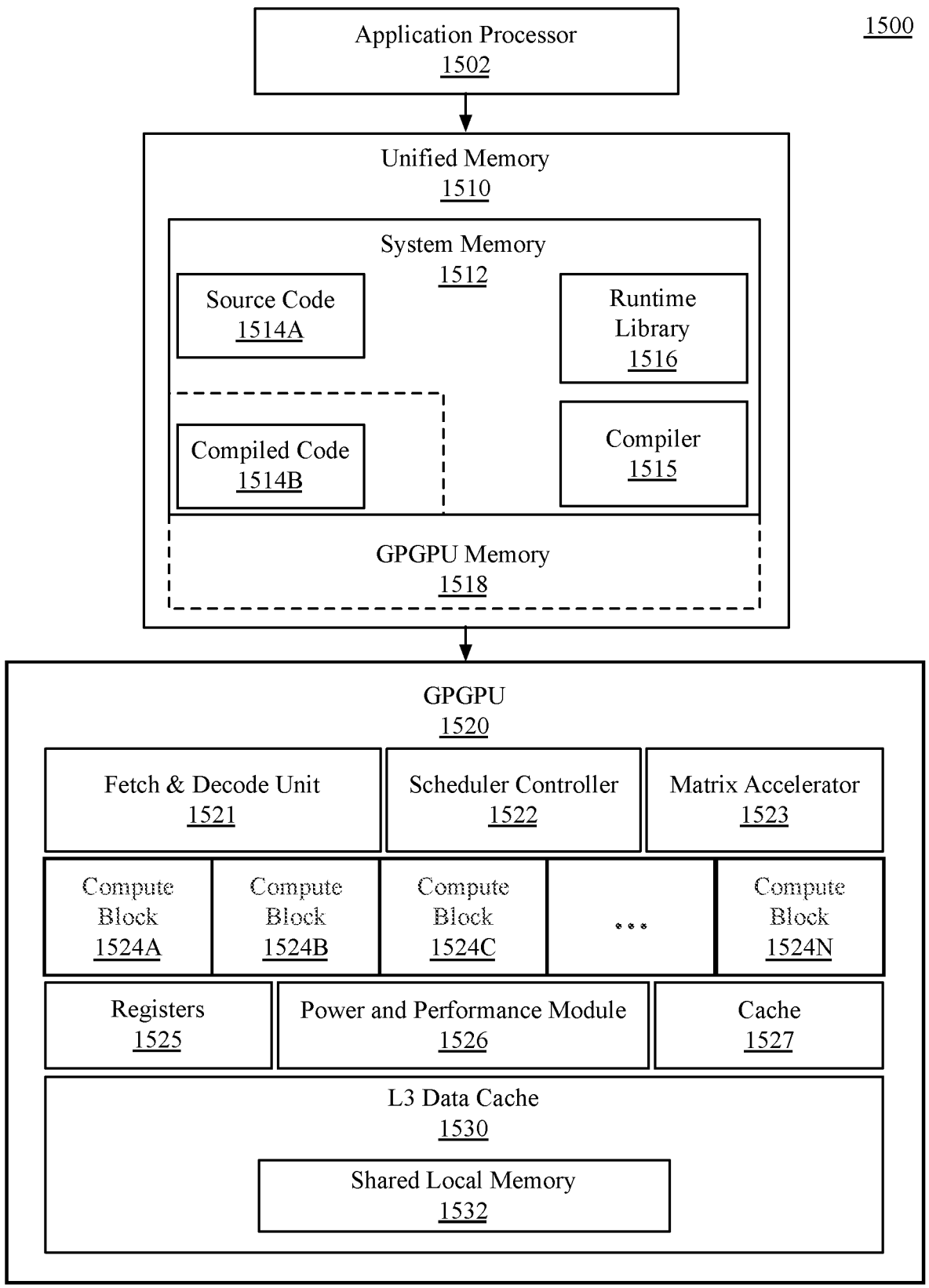
FIG. 15 is a block diagram of a data processing system, according to an embodiment.

FIG. 15 is a block diagram of a data processing system 1500, according to an embodiment. The data processing system 1500 is a heterogeneous processing system having a processor 1502, unified memory 1510, and a GPGPU 1520 including machine learning acceleration logic. The processor 1502 and the GPGPU 1520 can be any of the processors and GPGPU/parallel processors as described herein. The processor 1502 can execute instructions for a compiler 1515 stored in system memory 1512. The compiler 1515 executes on the processor 1502 to compile source code 1514A into compiled code 1514B. The compiled code 1514B can include instructions that may be executed by the processor 1502 and/or instructions that may be executed by the GPGPU 1520. During compilation, the compiler 1515 can perform operations to insert metadata, including hints as to the level of data parallelism present in the compiled code 1514B and/or hints regarding the data locality associated with threads to be dispatched based on the compiled code 1514B. The compiler 1515 can include the information necessary to perform such operations or the operations can be performed with the assistance of a runtime library 1516. The runtime library 1516 can also assist the compiler 1515 in the compilation of the source code 1514A and can also include instructions that are linked at runtime with the compiled code 1514B to facilitate execution of the compiled instructions on the GPGPU 1520.

The unified memory 1510 represents a unified address space that may be accessed by the processor 1502 and the GPGPU 1520. The unified memory can include system memory 1512 as well as GPGPU memory 1518. The GPGPU memory 1518 is memory within an address pace of the GPGPU 1520 and can include some or all of system memory 1512. In one embodiment the GPGPU memory 1518 can also include at least a portion of any memory dedicated for use exclusively by the GPGPU 1520. In one embodiment, compiled code 1514B stored in system memory 1512 can be mapped into GPGPU memory 1518 for access by the GPGPU 1520.

The GPGPU 1520 includes multiple compute blocks 1524A-1524N, which can include one or more of a variety of compute units or execution elements described herein. In one embodiment the GPGPU 1520 additionally includes a matrix accelerator 1523, which can include one or more special function compute units that are designed to accelerate a subset of matrix operations (e.g., dot product, etc.). The GPGPU 1520 can also include a set of resources that can be shared by the compute blocks 1524A-1524N and the matrix accelerator 1523, including but not limited to a set of registers 1525, a power and performance module 1526, and a cache 1527. In one embodiment the registers 1525 include directly and indirectly accessible registers, where the indirectly accessible registers are optimized for use by the matrix accelerator 1523. The power and performance module 1526 can be configured to adjust power delivery and clock frequencies for the compute blocks 1524A-1524N to power gate idle components within the compute blocks 1524A-1524N. In various embodiments the cache 1527 can include an instruction cache and/or a lower level data cache.

The GPGPU 1520 can additionally include an L3 data cache 1530, which can be used to cache data accessed from the unified memory 1510 by the matrix accelerator 1523 and/or the compute elements within the compute blocks 1524A-1524N. In one embodiment the L3 data cache 1530 includes shared local memory 1532 that can be shared by the compute elements within the compute blocks 1524A-1524N and the matrix accelerator 1523.

In one embodiment the GPGPU 1520 includes instruction handling logic, such as a fetch and decode unit 1521 and a scheduler controller 1522. The fetch and decode unit 1521 includes a fetch unit and decode unit to fetch and decode instructions for execution by one or more of the compute blocks 1524A-1524N or the matrix accelerator 1523. The instructions can be scheduled to the appropriate functional unit within the compute block 1524A-1524N or the matrix accelerator via the scheduler controller 1522. In one embodiment the scheduler controller 1522 is an ASIC configurable to perform advanced scheduling operations. In one embodiment the scheduler controller 1522 is a microcontroller or a low energy-per-instruction processing core capable of executing scheduler instructions loaded from a firmware module.

In one embodiment some functions to be performed by the compute blocks 1524A-1524N can be directly scheduled to or offloaded to the matrix accelerator 1523. In various embodiments the matrix accelerator 1523 includes processing element logic configured to efficiently perform matrix compute operations, such as multiply and add operations and dot product operations used by 3D graphics or compute shader programs. In one embodiment the matrix accelerator 1523 can be configured to accelerate operations used by machine learning frameworks. In one embodiment the matrix accelerator 1523 is an application specific integrated circuit explicitly configured to perform a specific set of parallel matrix multiplication and/or addition operations. In one embodiment the matrix accelerator 1523 is a field programmable gate array (FPGA) that provides fixed function logic that can updated between workloads. The set of matrix operations that can be performed by the matrix accelerator 1523 may be limited relative to the operations that can be performed by the compute block 1524A-1524N. However, the matrix accelerator 1523 can perform those the operations at a significantly higher throughput relative to the compute block 1524A-1524N.

Figure 16:
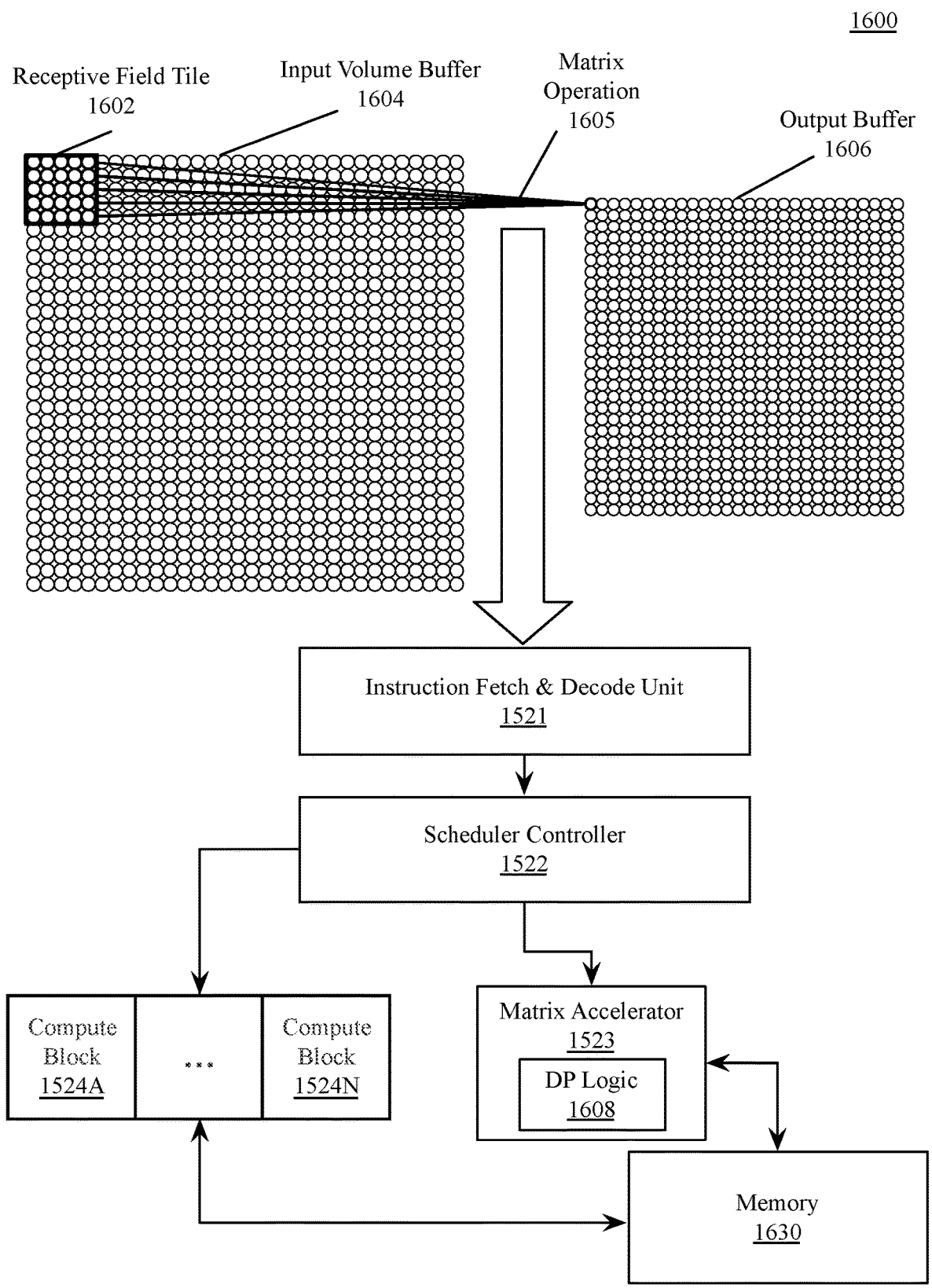
FIG. 16 illustrates a matrix operation performed by an instruction pipeline, according to an embodiment.

FIG. 16 illustrates a matrix operation 1605 performed by an instruction pipeline 1600, according to an embodiment. The instruction pipeline 1600 can be configured to perform a matrix operation 1605, such as, but not limited to a dot product operation. The dot product of two vectors is a scalar value that is equal to sum of products of corresponding components of the vectors. The dot product can be calculated as shown in equation (1) below.

$$\vec{a} \cdot \vec{b} = \sum_{i=1}^{n} a_i b_i = a_1 b_1 + \ldots + a_n b_n \quad (1)$$

The dot product can be used in a convolution operation for a convolutional neural network (CNN). FIG. 16 illustrates a two-dimensional (2D) convolution using a matrix operation 1605 including a dot product operation. While 2D convolution is illustrated, N-dimensional convolution can be performed on an N-dimensional volume using N-dimensional filters. A receptive field tile 1602 highlights a portion of an input volume in an input volume buffer 1604. The input volume buffer can be stored in memory 1630. A dot matrix operation 1605 can be performed between the data within the receptive field tile 1602 and a convolutional filter to generate a data point within output buffer 1606, which can also be stored in memory 1630. The memory 1630 can be any of the memory described herein, including system memory 1512, GPGPU memory 1518, or one or more cache memories 1527, 1530 as in FIG. 15.

The combination of the data points within the output buffer 1606 represents an activation map generated by the convolution operation. Each point within the activation map is generated by sliding the receptive field tile across the input volume buffer 1604. The activation map data can be input to an activation function to determine an output activation value. In one embodiment, convolution of the input volume buffer 1604 can be defined within a framework as high-level matrix operation 1705. The high-level matrix operations can be performed via primitive operations, such as a basic linear algebra subprogram (BLAS) operation. The primitive operations can be accelerated via hardware instructions executed by the instruction pipeline 1600.

The instruction pipeline 1600 used to accelerate hardware instructions can include the instruction fetch and decode unit 1521, which can fetch and decode hardware instructions, and the scheduler controller 1522 which can schedule decoded instructions to one or more execution units within the compute blocks 1524A-1524N and/or the matrix accelerator 1523. In one embodiment, a hardware instruction can be scheduled to the compute blocks 1524A-1524N and offloaded to the matrix accelerator 1523. The one or more hardware instructions and associated data to perform the matrix operation 1605 can be stored in the memory 1630. Output of the hardware instruction can also be stored in the memory 1630.

In one embodiment, the matrix accelerator 1523 can execute one or more hardware instructions to perform the matrix operation 1605 using integrated dot product logic 1608 (DP logic). The dot product logic 1608 can include a combination of programmable and fixed function hardware that is configurable to perform dot product operations. While functional units within the compute blocks 1524A-1524N can also be configured to perform dot product operations, the dot product logic 1608 can be configured to perform a limited subset of dot product operations at a significantly higher throughput relative to the compute block 1524A-1524N.

Figure 17A:
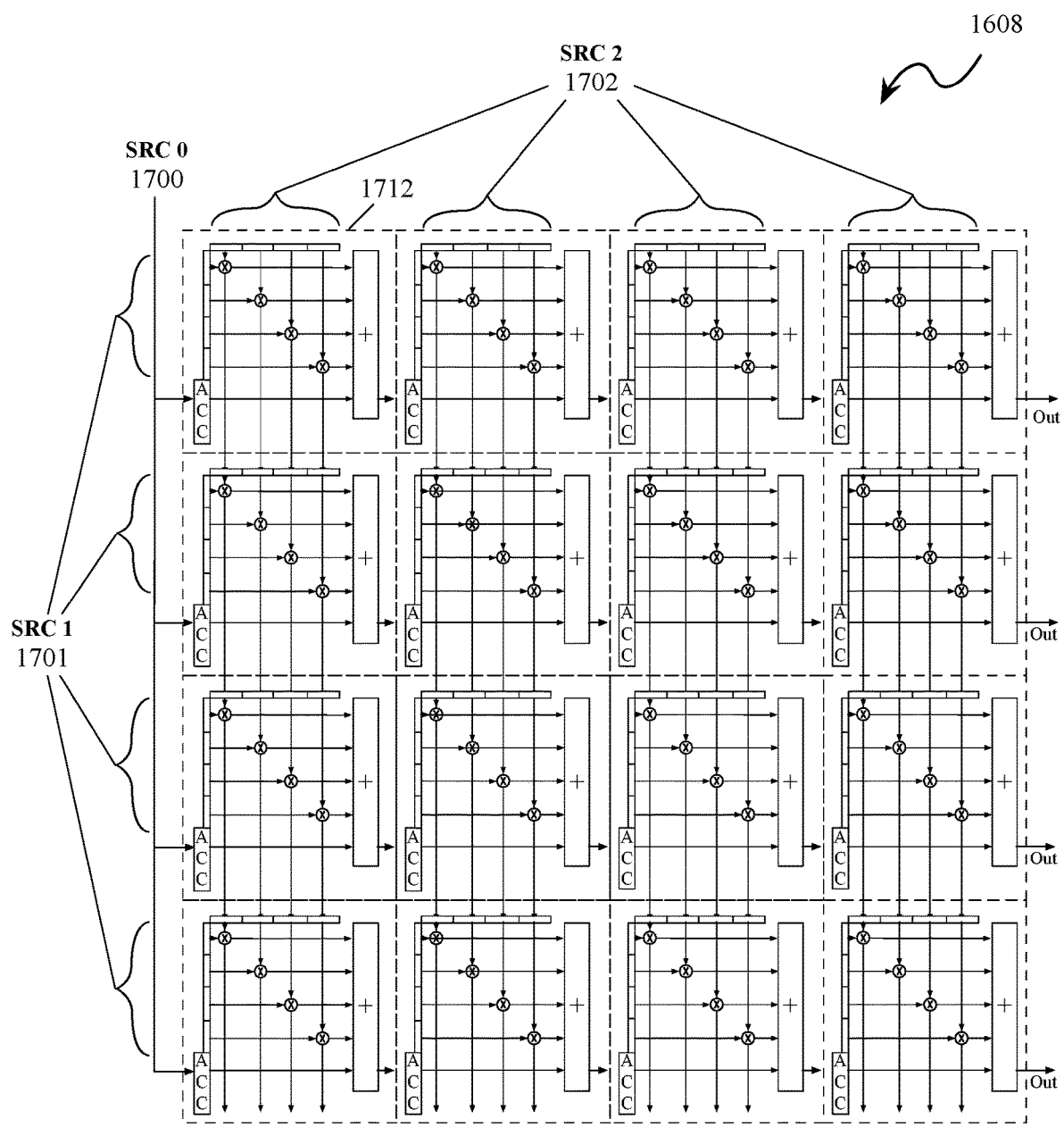
FIG. 17A-17B illustrate details of hardware-based dot product logic, according to some embodiments.
Figure 17B:
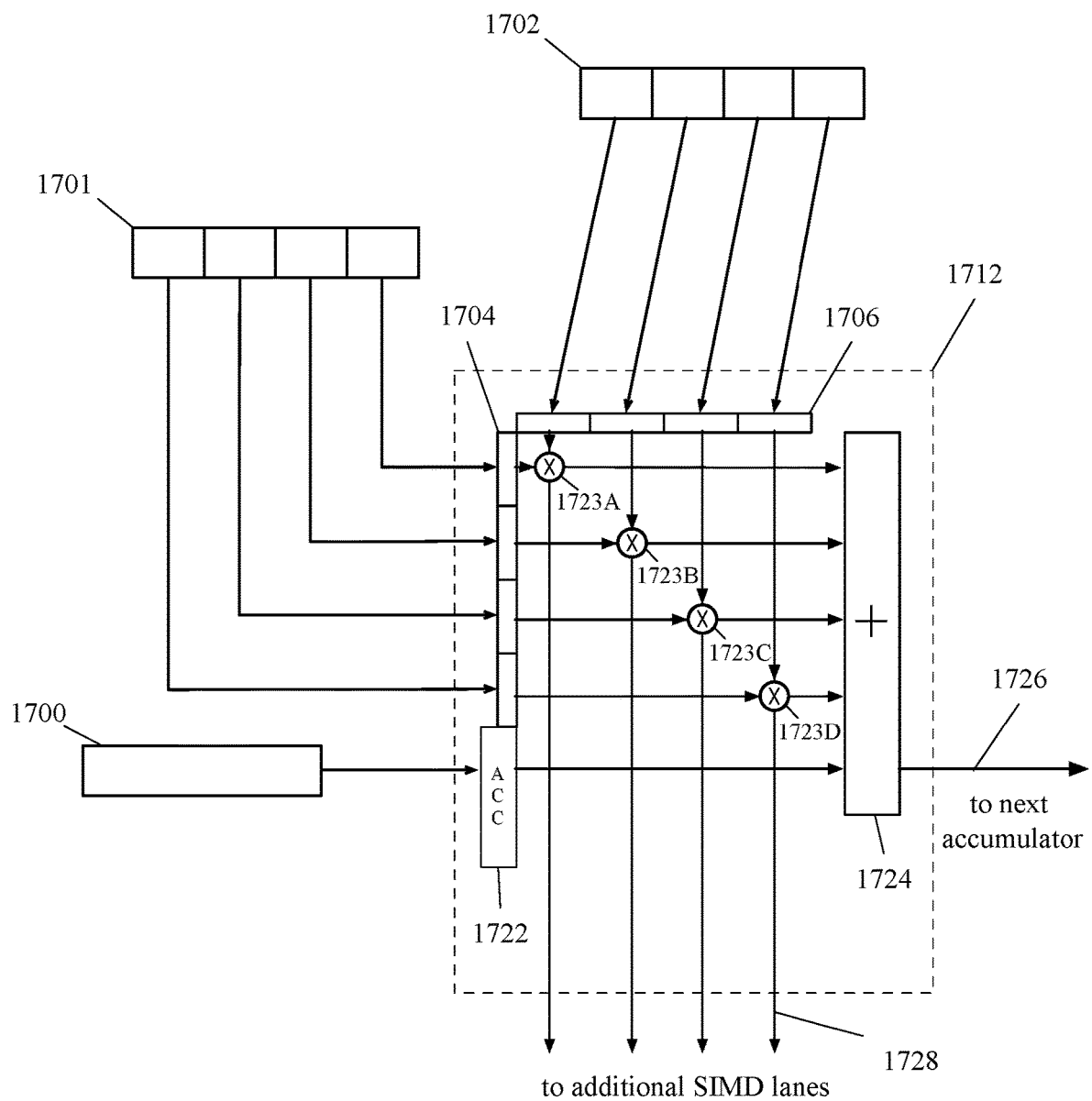

FIG. 17A-17B illustrate details of hardware-based dot product logic 1608, according to some embodiments. FIG. 17A illustrates a grid of multiple functional units that are configurable to perform multiple dot product operations within a single clock cycle. FIG. 17B illustrates a single exemplary functional unit.

As shown in FIG. 17A, in one embodiment the dot product logic 1608 is configurable to perform a set of parallel dot product operations using a variety of functional units. The dot products can be performed in a 'systolic' manner, in which SIMD data is pumped across multiple layers of functional units. In one embodiment the dot product logic 1608 can process a configurable number of SIMD channels of data using a configurable systolic depth. For a given instruction, a SIMD width and a systolic depth can be selected to process a set of source data. The systolic depth defines the number of systolic layers of hardware logic that will be used to process an instruction. A systolic layer is a group of multiplier and adder logic units having a variable SIMD width, where the systolic layer can receive, as input, an initial accumulator value and generates a dot product value for output to a successive systolic layer or to an output register.

In some embodiments, three sources can be processed, where each source can be a vector register or an immediate. In one embodiment, source 1700 (SRC0) can be one or more initial accumulator values, which can be a single value or a vector of accumulator values. The initial accumulator value will be added to the first set of dot products computed by each functional unit within the first systolic layer. The dot product computed by a functional unit can be provided to the next systolic layer for the given SIMD channel. The dot products can be computed based on source 1701 (SRC1) and source 1702 (SRC2), which are vector registers that can contain one more channels of packed data, each channel containing a four-element vector. In one embodiment, each channel is 32-bits wide and provides four, 8-bit vector elements. Some embodiments are configurable to calculate dot products from input vectors having 8-bit elements, 4-bit elements, and/or 2-bit elements. In one embodiment, mixed precision operations can be performed using any combination of supported element sizes. (e.g., 8-bit×2-bit, 8-bit×4-bit, 4-bit×4-bit, etc.). In one embodiment, the dot product logic 1608 is configured for integer calculation, although automatic fixed-point operation is configurable in some embodiments. Although the instruction described herein is a four-element dot product, in some embodiments the dot product logic 1608 may also be configured to support floating-point dot-product calculations on a different number of elements per vector.

In one embodiment, multiple channels of four-element vectors can be packed into a single vector register of various widths (e.g., 64-bit, 128-bit, 256-bit, 512-bit, etc.). Simultaneous dot products can be computed via the dot product logic 1608 for multiple channels of vector elements provided via source 1701 and source 1702. The number of channels of vector elements to be processed can be configured based on a selected execution size and systolic depth for the dot product calculation. In one embodiment, source vectors that are wider than the specified execution size and/or systolic depth may be calculated using multiple cycles of the dot product logic 1608.

The number of calculations that can be performed within a given clock cycle can vary based on the number of SIMD lanes and systolic layers. The dot product logic 1608, as illustrated, can perform sixteen dot products per SIMD lane of throughput using a systolic depth of four. If configured for eight SIMD lanes, the logic can perform 128 eight-bit integer (INT8) dot products within a given cycle. If configured for eight SIMD lanes and a systolic depth of eight, each lane can perform 32 eight-bit integer (INT8) dot products and 256 dot products in total. These specific number of operations are exemplary of one embodiment, and other embodiments vary in throughput. Furthermore, if the data types are different, then the number of operations will be scaled based on the different data types.

At each functional unit, a dot product is computed via multiplier and adder logic and the dot product is added to an accumulator value. The resulting data can be output to a destination register or provide to the accumulator of the next systolic layer. Details of a functional unit 1712 are shown in FIG. 17B.

As shown in FIG. 17B a functional unit 1712 can include a set of input data buffers 1704, 1706 and an accumulator 1722, which can each accept input data. In one embodiment, data buffer 1706 can accept source 1702, (SRC2), which can be a packed vector of input data. Input data buffer 1704 can accept a source 1701 (SRC1), which can also be a packed vector of input data. The accumulator 1722 can accept source 1700 (SRC0) that provides an initial accumulator value for the functional unit 1712. The initial accumulator value is added to the dot product computed from the elements of source 1701 and source 1702. The dot product is computed via an element-wise multiplication of the source vectors using a set of multipliers 1723A-1723D and an adder 1724. The multipliers 1723A-1723D are used to compute a set of products. A sum of the set of products is computed by the adder 1724. The sum can be accumulated with (e.g., added to) any initial value provided via source 1700. In one embodiment, this accumulated value can be provided as an input value 1726 to the next accumulator, which can reside in a subsequent systolic layer. In one embodiment, source 1701 may include multiple channels of input data. Additional channels of source 1701 can be relayed as SRC1 input to additional SIMD lanes 1728. In one embodiment, source 1702 may include multiple channels of input data. Additional channels of source 1702 can be used as SRC2 input data to logic units within additional systolic depths. In one embodiment, source 1700 can optionally include multiple channels, with additional channels provided as input to the accumulator within additional functional units. In one embodiment, source 1700 can be a single value that is added to each accumulator in each functional unit of the initial systolic layer.

Figure 18A:
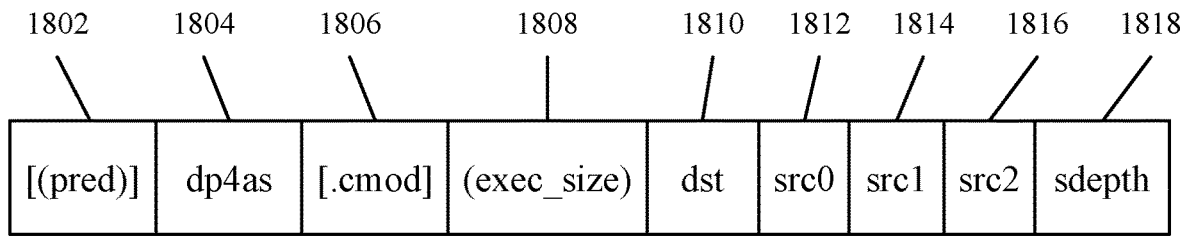
FIG. 18A-18B illustrate an instruction executable by dot product logic, according to embodiments described herein.
Figure 18B:
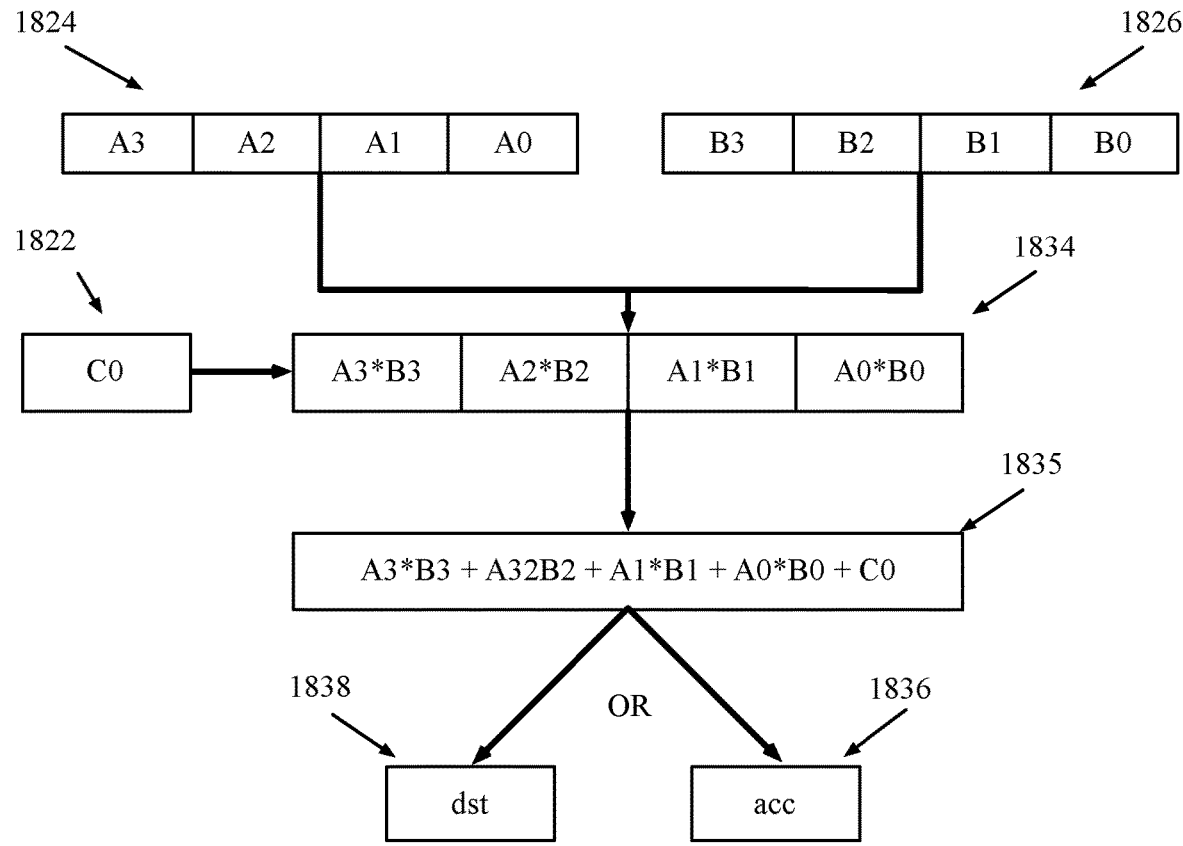

FIG. 18A-18B illustrate an instruction 1800 executable by dot product logic, according to embodiments described herein. FIG. 18A illustrates fields of a four-element dot product with accumulation instruction executable by systolic matrix logic provided by an embodiment. FIG. 18B illustrates element wise calculations performed during calculation of the four-element dot product with accumulation u using the systolic matrix logic.

FIG. 18A illustrates fields of a four-element dot product with accumulate instruction 1800, which, when executed, causes a systolic matrix accelerator to execute a four-element dot product with accumulate. In one embodiment, the instruction 1800 includes a predicate field 1802, an opcode field 1804, a conditional modifier field 1806, an execution size field 1808, and operand fields to specify a destination 1810, zeroth source 1812 (src0), first source 1814 (src1), second source 1816 (src2), and systolic depth 1818 (sdepth).

The predicate field 1802 can specify a predicate mask. The predicate mask can be used to enable or disable a SIMD execution channel of the instruction. In various embodiments, a disabled channel may bypass execution, or may execute while preventing the execution logic from modifying the architectural state associated with the disabled channel In one embodiment, output of the execution may be discarded without being committed.

The opcode field 1804 can specify an opcode that identifies the instruction 1800 to execution logic. In one embodiment the opcode field 1804 includes one or more bits that, when enabled, indicate that the instruction is to be executed by a matrix accelerator (e.g., matrix accelerator 1523). In one embodiment, the opcode field 1804 can also include one or more bits that specify that the instruction 1800 is to be executed by special purpose dot product logic, such as dot product logic (e.g., dot product logic 1608) within a matrix accelerator.

The conditional modifier field 1806 can be used to set a flag register based on the internal conditional signals output from the execution pipe, such as sign, zero, overflow, not-a-number (NaN), etc. If this field is set to 0000, no flag registers are updated. In one embodiment, supported conditionals include, but are not limited to, Zero or Equal, Not Zero or Not Equal, Greater-than, Greater-than-or-equal, Less-than, Less-than-or-equal, Overflow, and Unordered with Computed NaN. Furthermore, in some configurations, a source modifier field may be enabled.

The execution size 1808 (exec_size) specifies the number of execution channels for the instruction 1800. In the case of a four-element dot product instruction, in one embodiment the number of execution channels can be used to specify a number of pairs of four element vectors over which the calculation will be performed.

The destination 1810, zeroth source 1812 (src0), first source 1814 (src1), second source 1816 (src2) can be used to specify a destination to which a calculation is written and a location from which source data can be retrieved. In one embodiment the destination 1810 can specify a register to which data is to be written. In one embodiment the destination 1810 can be a scalar register, although in some embodiments the destination can also be a vector register that stores output from multiple channels. For example, where a single, four-element channel is specified, a single dot product can be written to a single output channel at the destination. Where multiple four-element channels are specified, multiple dot products can be written to a vector destination register. The zeroth source 1812, first source 1814, and second source 1816 can be register or immediate values that include one or more channels of source data, each channel having four elements to be processed by dot product logic, as with source 1700, source 1701, and source 1702 as in FIG. 17A-17B. The systolic depth 1818 (sdepth) can be used to specify the number systolic layers to use to process the input data. In one embodiment the systolic depth 1818 can be provided as an immediate value.

In some embodiments, additional fields other than those illustrated may be present. For example, in one embodiment a source modifier field is present which specifies the numeric modification of a source operand. The value of each data element of a source operand can optionally have its absolute value taken and/or its sign inverted prior to delivery to the execution pipeline. The absolute value modifier can be applied prior to the negate modifier, such that a guaranteed negative value can be produced. In one embodiment, a saturation field is present, which can be used to control destination saturation. When saturation is enabled, output data to the destination register is saturated. The specific saturation operation depends on the destination data type. Saturation is an operation that converts any data that is outside the saturation target range for the data type to the closest represented value with the target range.

Element wise operations of the instruction 1800 are shown in FIG. 18B. In one embodiment, a hardware buffer, temporary register, or internal register of a functional unit within dot product logic of systolic matrix accelerator can store elements A3-A0 of a channel 1824 of the first source 1814. An additional hardware buffer or temporary register can store elements B3-B0 of a channel 1826 of the second source 1816. The elements can be loaded into a functional unit (e.g., functional unit 1712 of FIG. 17A) of dot product logic (e.g., dot product logic 1608 of FIG. 16 and FIG. 17A). A set of multipliers (e.g., multipliers 1723A-1723D of FIG. 17B) can generate a set of products 1834. The set of products can be loaded into an adder (e.g., adder 1724 of FIG. 17B).

The adder can generate a sum of the set of products 1835, which can be accumulated with an existing accumulator value 1822 (e.g., C0). The existing accumulator value 1822 can be an initial accumulator value provided via the instruction 1800 or can be an accumulator value provided by a previous systolic layer. The accumulated sum of the set of products 1835 can then be output to a destination 1838, which can be the destination 1810 specified by the instruction 1800 or can be loaded as the initial accumulator value 1836 of the next systolic layer.

Figure 19:
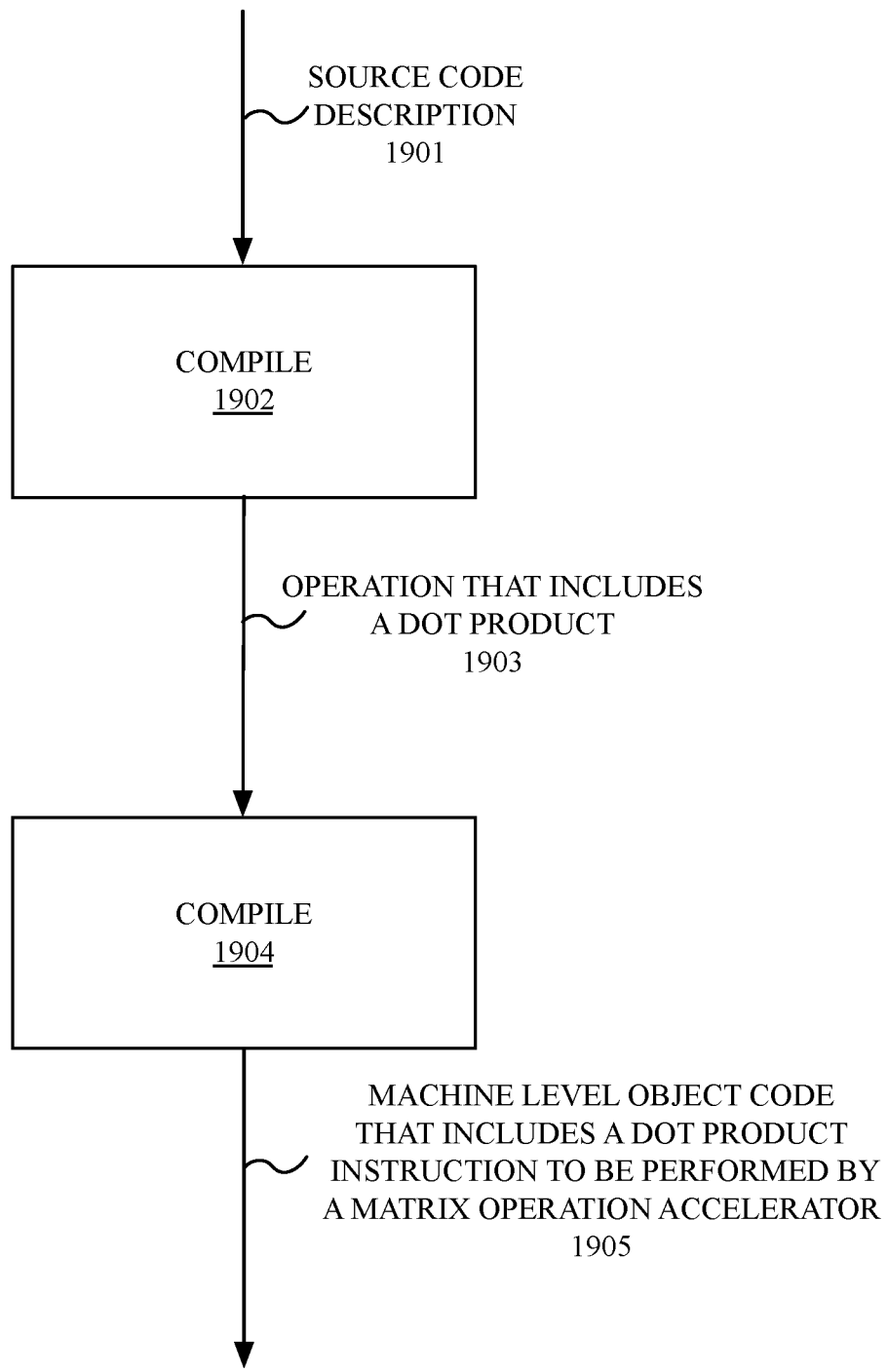
FIG. 19 illustrates a program code compilation process, according to an embodiment.

FIG. 19 illustrates a program code compilation process 1900, according to an embodiment. In one embodiment, a source code level description 1901 of a software program is compiled at a compiler 1902, which can include multiple levels of compilations, to a level having an operation 1903 that includes or specifies a dot product to be performed by processing logic. The operation 1903 can be an operation specified in an intermediate language or can be program code that references a primitive of a compute framework, such as a primitive provided by a machine learning framework. The operation 1903 that includes or specifies a dot product may then be further compiled by an additional compiler 1904, which can be a shader compiler, into machine level object code 1905 that includes a dot product instruction to be performed by an accelerator for matrix operations, as described herein.

Figure 20:
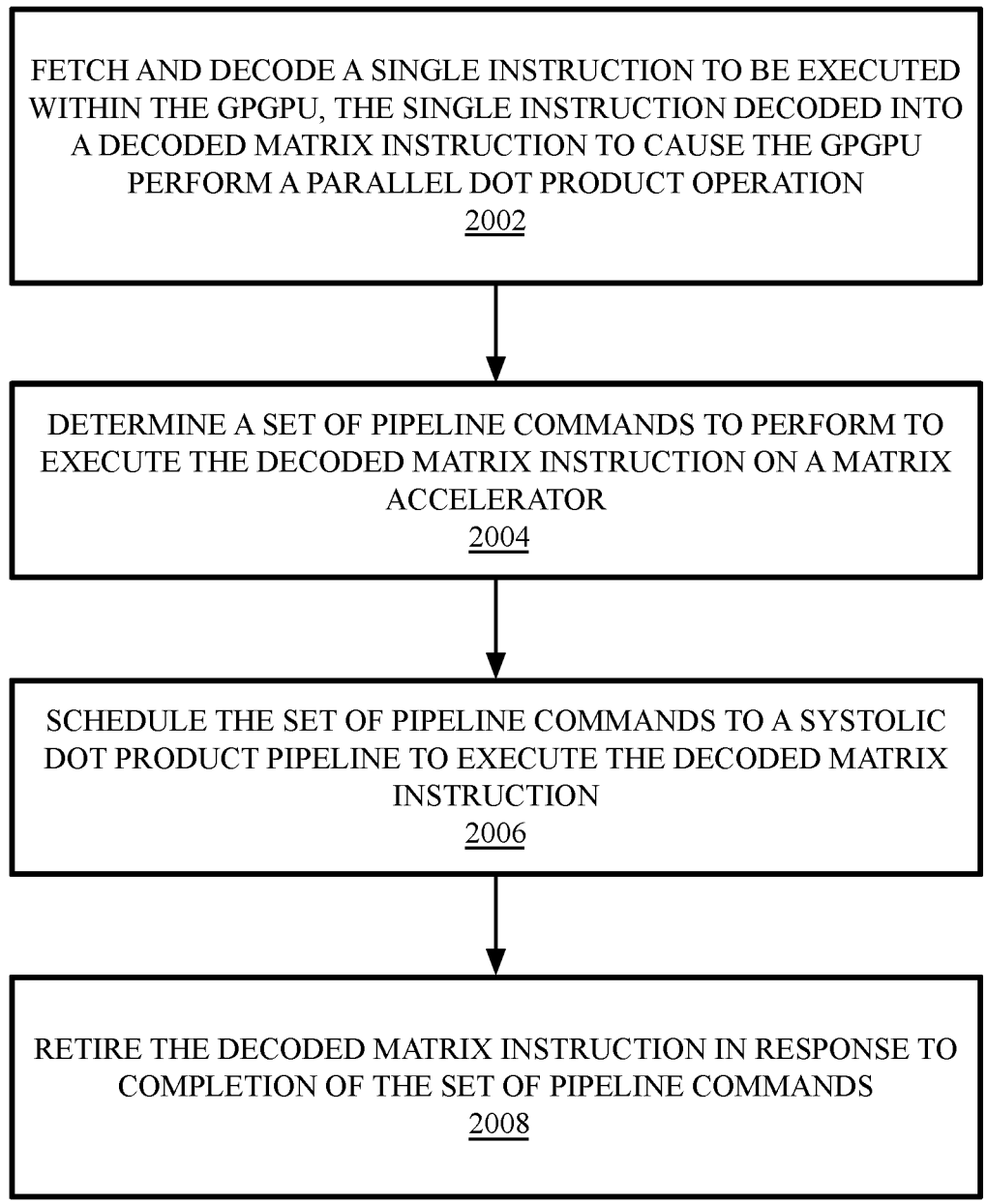
FIG. 20 illustrates a process to execute a dot product instruction within an instruction execution pipeline, according to embodiments described herein.

FIG. 20 illustrates a process 2000 to execute a dot product instruction within an instruction execution pipeline, according to embodiments described herein. The process 2000 can be performed using compute logic of a data processing system described herein, including, but not limited to the data processing system 1500 of FIG. 15. In one embodiment, fetch and decode logic (e.g., fetch and decode unit 1521) can fetch and decode a single instruction to be executed within the GPGPU, where the single instruction is decoded into a decoded matrix instruction, as shown at block 2002. The decoded instruction can cause the GPGPU to perform a parallel dot product operation as described herein. As shown at block 2004, the process 2000 can cause the execution pipeline to determine a set of pipeline commands to perform to execute the decoded matrix instruction on a matrix accelerator, such as the matrix accelerator 1523 shown in FIG. 15 and FIG. 16. As shown at block 2006, the process 2000 includes to schedule the set of pipeline commands to a systolic dot product pipeline, such as the dot product logic 1608 described herein, to execute the decoded matrix instruction. As shown at block 2008, the process 2000 additionally includes to retire the decoded matrix instruction in response to completion of the set of pipeline commands.

Figure 21:
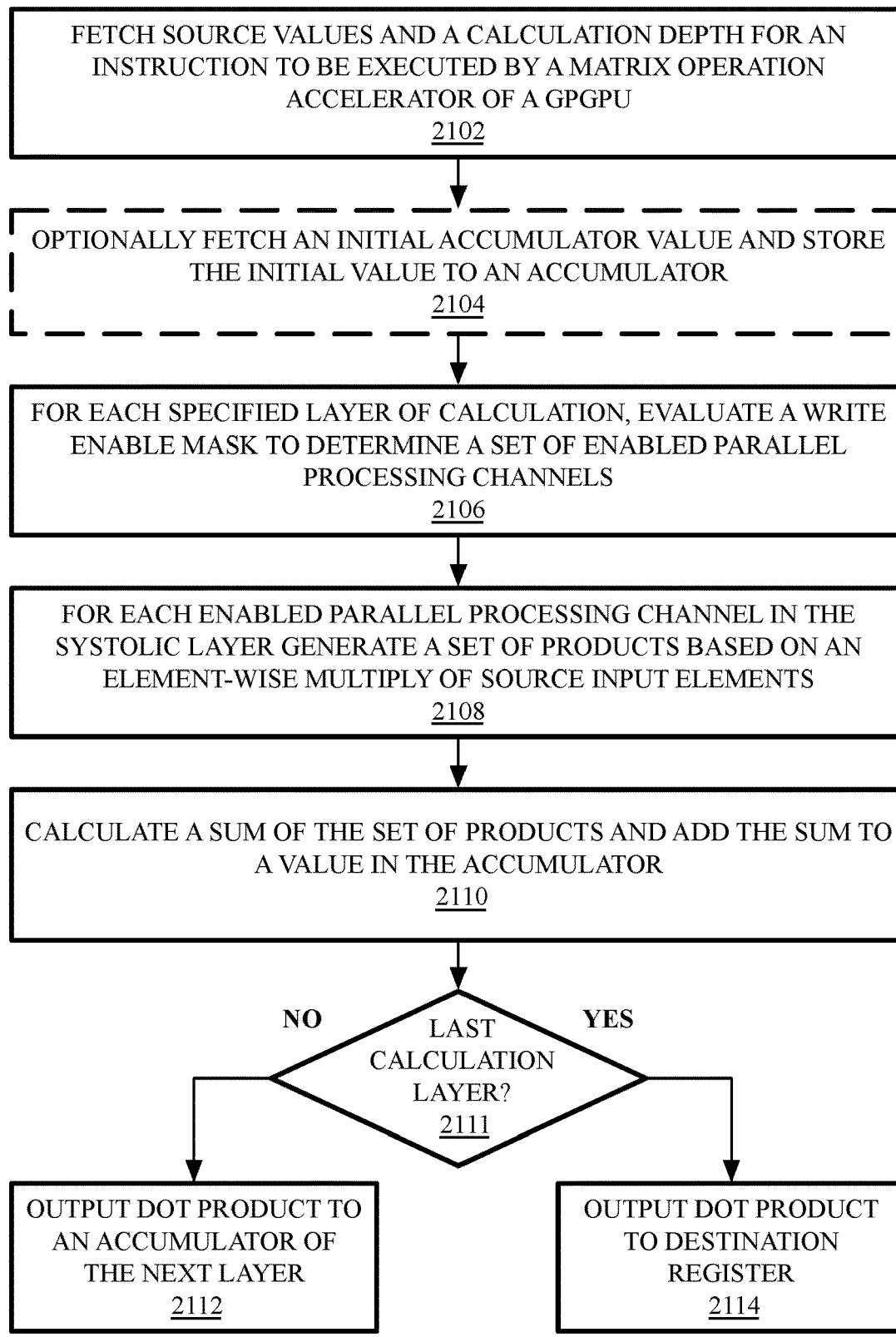
FIG. 21 illustrates a method by which hardware logic at a functional unit can execute an instruction to perform a systolic dot product with accumulate, according to an embodiment.

FIG. 21 illustrates a method 2100 by which hardware logic at a functional unit can execute an instruction to perform a systolic dot product with accumulate, according to an embodiment. The method 2100 can be performed via hardware-based systolic dot product computation logic as described herein (e.g., dot product logic 1608).

In one embodiment, the method 2100 includes for the hardware-based systolic dot product computation logic to fetch source values and a calculation depth for an instruction to be executed by a matrix operation accelerator of a GPGPU, as shown at block 2102. The calculation depth can specify a number of systolic layers to use to calculation the dot product for the instruction. The dot product logic can optionally fetch an initial accumulator value and store the initial value to an accumulator, as shown at block 2104. However, the initial value may be a zero value, depending on the supplied operands to the instruction. In one embodiment, the initial value is a value output from a functional unit of a different systolic layer.

As shown at block 2106, for each specified layer of calculation, the method 2100 includes for the dot product logic to evaluate a write enable mask to determine a set of enabled parallel processing channels. The write enable mask can be used to disable calculation of specific SIMD channels. In one embodiment, the write enable mask is configured at least in part based on a predicate mask supplied with the instruction to be executed.

As shown at block 2108, the method 2100 additionally includes for the dot product logic to generate, for each enabled parallel processing channel in the systolic layer, a set of products based on an element-wise multiply of source input elements. For the four-element dot product of some embodiment described herein, four elements of two sources are multiplied to generate the set of products. At block 2110, the method 2100 includes for the dot product logic to calculate a sum of the set of products and add the sum to a value in the accumulator. The value in the accumulator can be an initial value fetched at block 2104 or can be a value provided by a functional unit from a different systolic layer.

In one embodiment, where the method 2100 is performed at a functional unit that is in the last calculation layer, as shown at block 2111, the functional unit can output the calculated dot product to a specified destination register. If the method 2100 is not performed at a functional unit in the last calculation layer, the functional unit can output the calculated dot product to the accumulator of the next layer, as shown at block 2112.

Each layer can perform calculations using provided source data during each cycle. In one embodiment, calculations for a given instruction are performed in a pipelined manner Depending on the execution size and systolic depth specified for an instruction, dot product logic can perform operations for one or more instructions in parallel. Alternatively, a single instruction may require multiple cycles to be completed.

In one embodiment, the method 2100 of FIG. 21 can be performed by hardware logic configured based on the pseudocode shown in Table 1 below.

TABLE 1

Four Element Systolic Dot Product with Accumulate

```
V = Src2.regnum;
temp = Src0.Regnum; // Accumulated register input
k = Src2.regnum.subregnum;
    for (i = 0; i < sdepth; i++) {
        U = Src1.(Regnum + i);
        Evaluate (WrEn);
        for (n = 0; n < exec_size; n++) {
            if (WrEn.chan[n])
                temp.chan[n] = temp.chan[n]+
                    U.chan[n].0 * V.k.0 +
                    U.chan[n].1 * V.k.1 +
                    U.chan[n].2 * V.k.2 +
                    U.chan[n].3 * V.k.3;
                //chan[n].0 is a 0ᵗʰ byte in the nth dword
        }
    }
    k ++
}
dst.regnum = temp; // Write to output register
```

In the pseudocode of Table 1, Src0, Src1, and Src2 are registers that store operand data corresponding to zeroth source 1812 (src0), first source 1814 (src1), and second source 1816 (src2) as in FIG. 18A. Further with respect to FIG. 18A, sdepth corresponds to the systolic depth 1818, exec_size corresponds with the execution size 1808, and the dst corresponds with destination 1810. In the pseudocode, the identified registers reference to regnum and subregnum fields. The regnum field provides the register number for the operand. The subregnum field provides the sub-register number for the operand. The subregnum field, together with the corresponding RegNum field, provides a byte aligned address for the origin of the register region. For some instructions, this field provides bits [4:0] of the byte address, while the RegNum field provides bits [12:5].

Figure 22:
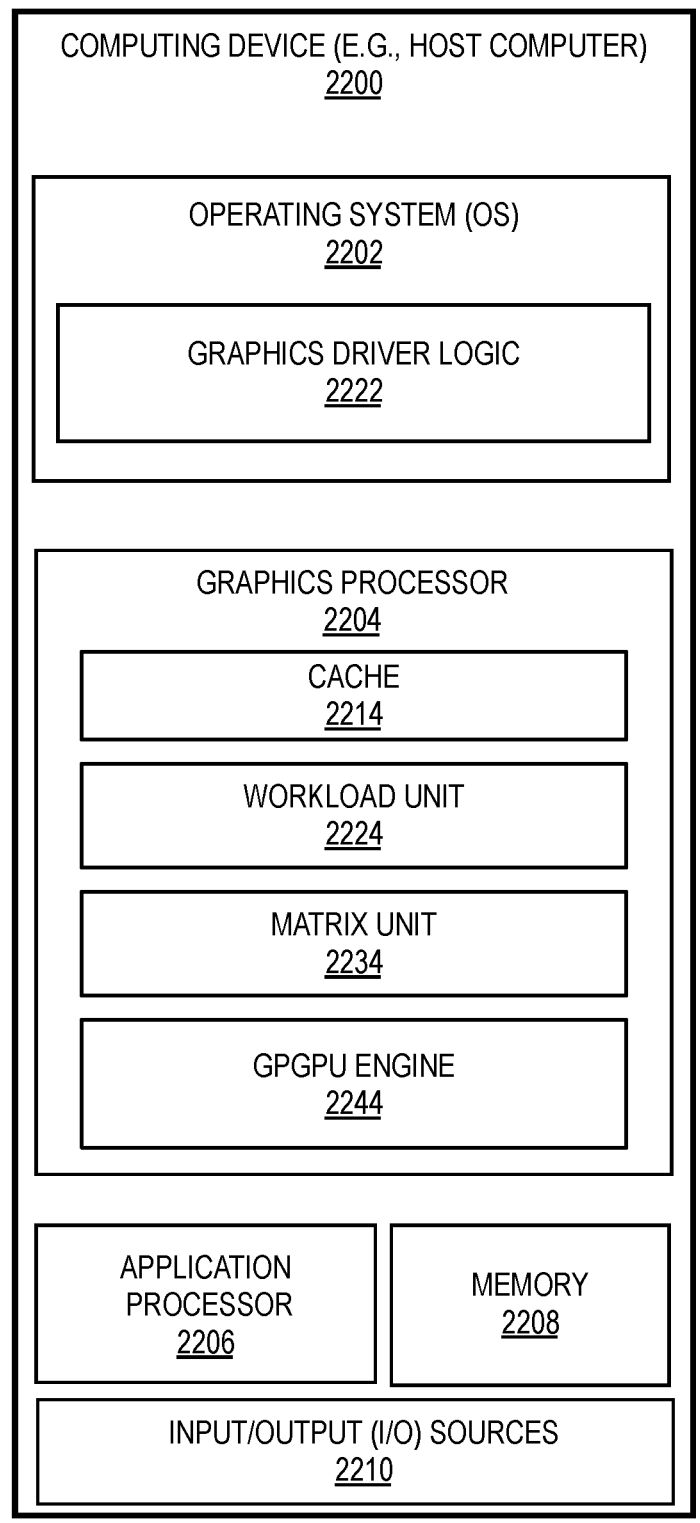
FIG. 22 is a block diagram of a computing device according to embodiments described herein.

FIG. 22 is a block diagram of a computing device 2200 including a graphics processor 2204, according to an embodiment. The computing device 2200 can be a computing device such as the data processing system 100 as in of FIG. 1. The computing device 2200 may also be or be included within a communication device such as a set-top box (e.g., Internet-based cable television set-top boxes, etc.), global positioning system (GPS)-based devices, etc. The computing device 2200 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2200 includes a mobile computing device employing an integrated circuit ("IC"), such as system on a chip ("SoC" or "SOC"), integrating various hardware and/or software components of computing device 2200 on a single chip.

The computing device 2200 includes a graphics processor 2204. The graphics processor 2204 represents any graphics processor described herein. The graphics processor includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics resources or image resources, or performing general purpose computational operations in a heterogeneous processor.

In one embodiment, the graphics processor 2204 includes a cache 2214, which can be a single cache or divided into multiple segments of cache memory, including but not limited to any number of L1, L2, L3, or L4 caches, render caches, depth caches, sampler caches, and/or shader unit caches. In some embodiments, the graphics processor 2204 includes a workload unit 2224, a matrix unit 2234, and a GPGPU engine 2244. The workload unit 2224 can schedule workload operations for execution on the matrix unit 2234 and the GPGPU engine 2244. The workload unit 2224 can have hardware logic units including, but not limited to the scheduler controller 1522 of FIG. 15. The matrix unit 2234, in one embodiment, includes the matrix accelerator 1523 as in FIG. 15. The matrix unit 2234 can include dot product acceleration logic, including, but not limited to the systolic dot product logic described herein.

As illustrated, in one embodiment, and in addition to the graphics processor 2204, the computing device 2200 may further include any number and type of hardware components and/or software components, including, but not limited to an application processor 2206, memory 2208, and input/output (I/O) sources 2210. The application processor 2206 can interact with a hardware graphics pipeline, as illustrated with reference to FIG. 3, to share graphics pipeline functionality. Processed data is stored in a buffer in the hardware graphics pipeline and state information is stored in memory 2208. The resulting data can be transferred to a display controller for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 2206 can include one or processors, such as processor(s) 102 of FIG. 1 and may be the central processing unit (CPU) that is used at least in part to execute an operating system (OS) 2202 for the computing device 2200. The OS 2202 can serve as an interface between hardware and/or physical resources of the computing device 2200 and one or more users. The OS 2202 can include driver logic for various hardware devices in the computing device 2200, including graphics driver logic 2222, such as the user mode graphics driver 1026 and/or kernel mode graphics driver 1029 of FIG. 10.

It is contemplated that in some embodiments the graphics processor 2204 may exist as part of the application processor 2206 (such as part of a physical CPU package) in which case, at least a portion of the memory 2208 may be shared by the application processor 2206 and graphics processor 2204, although at least a portion of the memory 2208 may be exclusive to the graphics processor 2204, or the graphics processor 2204 may have a separate store of memory. The memory 2208 may comprise a pre-allocated region of a buffer (e.g., framebuffer); however, it should be understood by one of ordinary skill in the art that the embodiments are not so limited, and that any memory accessible to the lower graphics pipeline may be used. The memory 2208 may include various forms of random access memory (RAM) (e.g., SDRAM, SRAM, etc.) comprising an application that makes use of the graphics processor 2204 to render a desktop or 3D graphics scene. A memory controller hub, such as memory controller 116 of FIG. 1, may access data in the memory 2208 and forward it to graphics processor 2204 for graphics pipeline processing. The memory 2208 may be made available to other components within the computing device 2200. For example, any data (e.g., input graphics data) received from various I/O sources 2210 of the computing device 2200 can be temporarily queued into memory 2208 prior to their being operated upon by one or more processor(s) (e.g., application processor 2206) in the implementation of a software program or application. Similarly, data that a software program determines should be sent from the computing device 2200 to an outside entity through one of the computing system interfaces, or stored into an internal storage element, is often temporarily queued in memory 2208 prior to its being transmitted or stored.

The I/O sources can include devices such as touchscreens, touch panels, touch pads, virtual or regular keyboards, virtual or regular mice, ports, connectors, network devices, or the like, and can attach via a platform controller hub 130 as referenced in FIG. 1. Additionally, the I/O sources 2210 may include one or more I/O devices that are implemented for transferring data to and/or from the computing device 2200 (e.g., a networking adapter); or, for a large-scale non-volatile storage within the computing device 2200 (e.g., hard disk drive). User input devices, including alphanumeric and other keys, may be used to communicate information and command selections to graphics processor 2204. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 2200 may be employed to observe gestures, record audio and video and to receive and transmit visual and audio commands.

I/O sources 2210 configured as network interfaces can provide access to a network, such as a LAN, a wide area network (WAN), a metropolitan area network (MAN), a personal area network (PAN), Bluetooth, a cloud network, a cellular or mobile network (e.g., 3$^{rd}$ Generation (3G), 4$^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2200 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one, or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of non-transitory machine-readable media suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Embodiments described herein provided for an instruction and associated logic to enable GPGPU program code to access special purpose hardware logic to accelerate dot product operations. The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides for a graphics processing unit comprising a fetch unit to fetch an instruction for execution and a decode unit to decode the instruction into a decoded instruction. The decoded instruction is a matrix instruction to cause the graphics processing unit to perform a parallel dot product operation. The GPGPU also includes a systolic dot product unit to execute the decoded instruction across one or more SIMD lanes using multiple systolic layers. To execute the decoded instruction, a dot product computed at a first systolic layer is to be output to a second systolic layer. Each systolic layer includes one or more sets of interconnected multipliers and adders, each set of multipliers and adders to generate a dot product.

One embodiment provides for a method of executing an instruction to calculate a dot product of one or more sets of four element vectors within a general-purpose graphics processing unit (GPGPU). The method comprises fetching and decoding a single instruction to be executed within the GPGPU, the single instruction decoded into a decoded matrix instruction to cause the GPGPU perform a parallel dot product operation; determining a set of pipeline commands to perform to execute the decoded matrix instruction on a matrix accelerator; and scheduling the set of pipeline commands to systolic dot product circuitry of the matrix accelerator to execute the decoded matrix instruction.

One embodiment provides for a data processing system comprising one or more processors, at least one of the one or more processors including a graphics processing unit, the graphics processing unit including hardware logic to accelerate matrix operations, the hardware logic including a systolic dot product unit including multiple systolic layers. Each systolic layer includes one or more sets of interconnected multipliers and adders, each set of multipliers and adders to generate a dot product, and a non-transitory machine-readable medium storing instruction for execution by the systolic dot product unit. At least one instruction, when decoded, is to cause the systolic dot product unit to perform a parallel dot product calculation using one or more single instruction multiple data (SIMD) lanes.

One embodiment provides a graphics processing unit comprising a fetch unit to fetch a single instruction for execution, a decode unit to decode the single instruction into a decoded instruction, and systolic dot product circuitry. The decoded instruction is to cause the graphics processing unit to perform a set of parallel dot product operations on elements of input matrices and the single instruction is to specify a systolic depth. The systolic depth indicates a number of pipeline stages to use to perform the set of parallel dot product operations. The systolic dot product circuitry executes the decoded instruction across one or more parallel processor lanes using multiple systolic layers associated with multiple pipeline stages. The systolic dot product circuitry is to calculate a dot product via the indicated number of pipeline stages.

One embodiment provides method comprising fetching and decoding a single instruction to be executed within a general-purpose graphics processing unit (GPGPU), the single instruction decoded into a decoded instruction to cause the GPGPU to perform a set of parallel dot product operations on elements of input matrices. The single instruction specifies a systolic depth, the systolic depth to indicate a number of pipeline stages to use to perform a set of parallel dot product operations. The method additionally includes determining a set of pipeline commands to perform to execute the decoded instruction on a matrix accelerator including systolic dot product circuitry, scheduling the set of pipeline commands to multiple pipeline stages of the matrix accelerator to execute the decoded instruction, and executing the decoded instruction across one or more parallel processor lanes using multiple systolic layers associated with the multiple pipeline stages. The systolic dot product circuitry is to calculate a dot product via the indicated number of pipeline stages.

One embodiment provides a data processing system comprising one or more processors, at least one of the one or more processors including a graphics processing unit, the graphics processing unit including hardware logic to accelerate matrix operations, the hardware logic including systolic dot product circuitry including multiple systolic layers. Each systolic layer includes one or more sets of interconnected multipliers and adders, each set of multipliers and adders to generate a dot product. The system additionally includes a cache to store at least one instruction for execution by the systolic dot product circuitry. The at least one instruction, when decoded, is to cause the systolic dot product circuitry to perform a parallel dot product calculation using one or more parallel processor lanes of the systolic dot product circuitry, the at least one instruction is to specify a systolic depth, the systolic depth to indicate a number of pipeline stages to use to calculate the dot product, and the systolic dot product circuitry is to perform the parallel dot product calculation via the indicated number of pipeline stages.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing unit comprising:

a fetch unit to fetch a single instruction for execution;

a decode unit to decode the single instruction into a decoded instruction, wherein the decoded instruction is to cause the graphics processing unit to perform a set of parallel dot product operations on elements of input matrices and the single instruction is to specify a systolic depth, the systolic depth to indicate a number of pipeline stages to use to perform the set of parallel dot product operations; and systolic dot product circuitry to execute the decoded instruction across one or more parallel processor lanes using multiple systolic layers associated with multiple pipeline stages, wherein the systolic dot product circuitry is to calculate a dot product via the indicated number of pipeline stages.

2. The graphics processing unit as in claim 1, wherein the multiple pipeline stages include a first pipeline stage to compute a first dot product and add the first dot product to an initial accumulator value, and a second pipeline stage to compute a second dot product and add the second dot product to the first dot product.

3. The graphics processing unit as in claim 2, the decoded instruction to provide the initial accumulator value.

4. The graphics processing unit as in claim 2, wherein the graphics processing unit includes a matrix accelerator to accelerate matrix operations and the matrix accelerator includes the systolic dot product circuitry.

5. The graphics processing unit as in claim 4, further comprising a scheduler microcontroller configured to schedule the decoded instruction to a processing resource selected from one of the matrix accelerator and a functional unit of a compute block that is external to the matrix accelerator.

6. The graphics processing unit as in claim 1, wherein the decoded instruction is associated with a predication mask, the predication mask to enable or disable one or more channels of one or more parallel processor lanes, wherein the one or more parallel processor lanes are single instruction multiple data (SIMD) lanes.

7. The graphics processing unit as in claim 6, wherein each channel is associated with one or more four-element vectors.

8. The graphics processing unit as in claim 7, wherein the systolic dot product circuitry is to output a dot product to a destination selected from one of an accumulator of a subsequent systolic layer and a destination register based on the systolic depth specified for the decoded instruction.

9. The graphics processing unit as in claim 7, the decoded instruction to specify an execution size, the execution size indicate a number of SIMD channels to use to calculate the dot product.

10. A method comprising:
fetching and decoding a single instruction to be executed within a general-purpose graphics processing unit (GPGPU), the single instruction decoded into a decoded instruction to cause the GPGPU to perform a set of parallel dot product operations on elements of input matrices, wherein the single instruction specifies a systolic depth, the systolic depth to indicate a number of pipeline stages to use to perform a set of parallel dot product operations;
determining a set of pipeline commands to perform to execute the decoded instruction on a matrix accelerator including systolic dot product circuitry;
scheduling the set of pipeline commands to multiple pipeline stages of the matrix accelerator to execute the decoded instruction; and
executing the decoded instruction across one or more parallel processor lanes using multiple systolic layers associated with the multiple pipeline stages, wherein the systolic dot product circuitry is to calculate a dot product via an indicated number of pipeline stages.

11. The method as in claim 10, additionally comprising retiring the decoded instruction in response to completion of the set of pipeline commands on the matrix accelerator.

12. The method as in claim 10, additionally comprising fetching source values and the systolic depth for the decoded instruction.

13. The method as in claim 12, additionally comprising:
fetching an initial value for an accumulator; and
storing the initial value to an accumulator of a systolic layer of the systolic dot product circuitry.

14. The method as in claim 10, wherein the set of pipeline commands to perform to execute the decoded instruction on a matrix accelerator cause the systolic dot product circuitry of the matrix accelerator to evaluate a write enable mask to determine a set of enabled parallel processing channels and, for each enabled parallel processing channel, to generate a set of products based on an element-wise multiply of source input elements.

15. The method as in claim 14, the set of pipeline commands to additionally cause the systolic dot product circuitry to calculate a sum of the set of products and add the sum to a value in an accumulator of a layer of the systolic dot product circuitry.

16. The method as in claim 15, additionally comprising outputting a dot product to the accumulator of a subsequent layer of the systolic dot product circuitry or to a destination register based on a calculation depth for the decoded instruction.

17. A data processing system comprising:
one or more processors, at least one of the one or more processors including a graphics processing unit, the graphics processing unit including hardware logic to accelerate matrix operations, the hardware logic including systolic dot product circuitry including multiple systolic layers, wherein each systolic layer includes one or more sets of interconnected multipliers and adders, each set of multipliers and adders to generate a dot product; and
a cache to store at least one instruction for execution by the systolic dot product circuitry, wherein at least one instruction, when decoded, is to cause the systolic dot product circuitry to perform a parallel dot product calculation using one or more parallel processor lanes of the systolic dot product circuitry, the at least one instruction is to specify a systolic depth, the systolic depth to indicate a number of pipeline stages to use to calculate the dot product, and the systolic dot product circuitry is to perform the parallel dot product calculation via an indicated number of pipeline stages.

18. The data processing system as in claim 17, the at least one instruction to cause the systolic dot product circuitry to compute a first dot product at a first systolic layer, output the first dot product to an accumulator at a second systolic layer, add the first dot product to a second dot product computed at the second systolic layer, and compute a third dot product at the first systolic layer concurrently with computation of the second dot product.

19. The data processing system as in claim 18, wherein the systolic dot product circuitry is to add the dot product to an accumulator value at the first systolic layer before the output to the second systolic layer and the at least one instruction to specify the accumulator value.

20. The data processing system as in claim 19, further comprising a scheduler microcontroller configured to schedule the at least one instruction to a processing resource selected from one of the systolic dot product circuitry and a functional unit of a compute block that is external to the systolic dot product circuitry.

* * * * *